United States Patent
Wong et al.

(10) Patent No.: US 12,354,361 B2
(45) Date of Patent: Jul. 8, 2025

(54) VISION-BASED MONITORING OF SITE SAFETY COMPLIANCE BASED ON WORKER RE-IDENTIFICATION AND PERSONAL PROTECTIVE EQUIPMENT CLASSIFICATION

(71) Applicant: The Hong Kong University of Science and Technology, Hong Kong (CN)

(72) Inventors: Kok Yiu Wong, Hong Kong (CN); Pak Him Leung, Hong Kong (CN); Jack Chin Pang Cheng, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 419 days.

(21) Appl. No.: 17/895,373

(22) Filed: Aug. 25, 2022

(65) Prior Publication Data

US 2023/0186634 A1    Jun. 15, 2023

Related U.S. Application Data

(60) Provisional application No. 63/289,142, filed on Dec. 14, 2021.

(51) Int. Cl.
| | |
|---|---|
| *G06V 20/52* | (2022.01) |
| *G06Q 30/018* | (2023.01) |
| *G06V 10/40* | (2022.01) |
| *G06V 10/74* | (2022.01) |
| *G06V 10/764* | (2022.01) |
| *G06V 10/774* | (2022.01) |
| *G06V 10/82* | (2022.01) |

(52) U.S. Cl.
CPC ........... *G06V 20/52* (2022.01); *G06Q 30/018* (2013.01); *G06V 10/40* (2022.01); *G06V 10/761* (2022.01); *G06V 10/764* (2022.01); *G06V 10/774* (2022.01); *G06V 10/82* (2022.01)

(58) Field of Classification Search
CPC ...... G06V 20/52; G06V 40/103; G06V 20/58; G06V 10/40; G06V 10/761; G06V 10/764; G06V 10/774; G06V 10/82; G06V 20/41
See application file for complete search history.

(56) References Cited

PUBLICATIONS

Agrawal, T., Kirkpatrick, C., Imran, K., & Figus, M. (Oct. 16, 2020). Automatically detecting personal protective equipment on persons in images using amazon rekognition | AWS machine learning blog. (Year: 2020).*

(Continued)

*Primary Examiner* — Gregory A Morse
*Assistant Examiner* — David Alexander Wambst
(74) *Attorney, Agent, or Firm* — Leydig, Voit & Mayer, Ltd.

(57) ABSTRACT

A system for monitoring safety compliance comprises a plurality of cameras and a computing system. The plurality of cameras are configured to obtain data, and the data comprises multiple images associated with one or more objects. The computing system is configured to process the data to determine the safety compliance of the one or more objects associated with the multiple images based on implementing a first model trained for re-identification. The computing system is further configured to train the first model for re-identification, by determining a similarity loss and updating the first model based on the similarity loss.

20 Claims, 13 Drawing Sheets

(56) References Cited

PUBLICATIONS

Chicco, D. (2021). Siamese neural networks: An Overview. https://www.researchgate.net/publication/344000537_Siamese_Neural_Networks_An_Overview (Year: 2021).*

Maiza, A. (Mar. 11, 2020). The unknown benefits of using a soft-F1 loss in classification systems. Medium. https://towardsdatascience.com/the-unknown-benefits-of-using-a-soft-f1-loss-in-classification-systems-753902c0105d (Year: 2020).*

Harmouch, M. (Apr. 2, 2021). 17 types of similarity and dissimilarity measures used in data science. Medium. https://towardsdatascience.com/17-types-of-similarity-and-dissimilarity-measures-used-in-data-science-3eb914d2681 (Year: 2021).*

Chelliah, I. (Dec. 23, 2020). Confusion matrix-clearly explained. All About AI-ML. https://indhumathychelliah.com/2020/12/23/confusion-matrix%E2%80%8A-%E2%80%8Aclearly-explained/ (Year: 2020).*

Rosenthal, E. (Dec. 5, 2016). Using Keras' Pretrained Neural Networks for Visual Similarity Recommendations | Ethan Rosenthal. https://www.ethanrosenthal.com/2016/12/05/recasketch-keras/ (Year: 2016).*

Szegedy, C., Vanhoucke, V., Ioffe, S., & Shlens, J. (2016). Rethinking the inception architecture for computer vision. https://ieeexplore.ieee.org/iel7/7776647/7780329/07780677.pdf (Year: 2016).*

Bochkovskiy, A., Wang, C.-Y., & Liao, H.-Y. (2020). YOLOv4: Optimal Speed and Accuracy of Object Detection. https://arxiv.org/pdf/2004.10934 (Year: 2020).*

Wang, Z., Wu, Y., Yang, L., Thirunavukarasu, A., Evison, C., & Zhao, Y. (2021). Fast Personal Protective Equipment Detection for Real Construction Sites Using Deep Learning Approaches. Sensors, 21(10), 3478. https://doi.org/10.3390/s21103478 (Year: 2021).*

Saudi, M.M., et al., "Image Detection Model for Construction Worker Safety Conditions Using Faster R-CNN", (IJACSA) Int. J. Adv. Comput Sci. Appl., vol. II, No. 6, pp. 246-250, (2020).

Ye, M., et al., "Deep Learning for Person Re-Identification: A Survey and Outlook" IEEE Transactions on Pattern Analysis and Machine Intelligence, vol. 44, No. 6, pp. 2872-2893, (Jun. 2022).

Wang, G., et al., "Weakly Supervised Person Re-ID Differentiable Graphical Learning and A New Benchmark". IEEE Transactions on Neural Networks and Learning Systems, vol. 32, No. 5, pp. 2142-2156 (May 2021).

Hamdoun, O., et al., "Person Re-identification in Multi-Camera System by Signature Based on Interest Point Descriptors Collected on Short Video Sequences", in 2008 Second ACM/IEEE Int. Conf. Distrib. Smart Cameras pp. 1-6, (2008).

Huang, H., et al., "EANet: Enhancing Alignment for Cross-Domain Person Re-Identification", ArXiv Prepr. ArXiv1812.11369v1, pp. 1-12, (2018).

Wang, H., et al., "Parameter-Free Spatial Attention Network for Person Re-Identification", ArXiv Prepr. ArXiv1811.12150v1, pp. 1-11, (2018).

Zhou, K., et al., "Learning Generalisable Omni-Scale Representations for Person Re-Identification", IEEE Transactions on Pattern Analysis and Machine Intelligence, vol. 44, No. 9, pp. 5056-5069, (2019).

Hermans, A., et al., "In Defense of the Triplet Loss for Person Re-Identification", ArXiv Prepr. ArXivl 1703.07737v4, pp. 1-17, (2017).

Das, A., et al., "Consistent Re-Identification in a Camera Network", Eur. Conf. Comput. Vis., Springer International Publishing Cham, pp. 330-345, (2014).

Tan, S., "Neighbor-weighted K-nearest neighbor for unbalanced text corpus", Expert Systems with Applications 28, pp. 667-671, (2005).

Kim, J et al., "Interaction analysis for vision-based activity identification of earthmoving excavators and dump trucks", Automation in Construction, 87, pp. 297-308, (2018).

Cheng, Jack C.P., et al., "Vision-based monitoring of site safety compliance based on worker re-identification and personal protective equipment classification", Automation in Construction, vol. 139, 104312, (18 pages total), (2022).

Zheng, L., et al., "Person Re-identification: Past, Present and Future", Journal of Latex Class Files, vol. 14, No. 8, pp. 1-20, (Aug. 2015).

He, K et al., "Deep Residual Learning for Image Recognition", in Proc. IEEE Conf. Computer Vision Pattern Recognit, pp. 770-778 (2016).

Xiao, T., et al., "Learning Deep Feature Representations with Domain Guided Dropout for Person Re-Identification", Proc. IEEE Comput. Soc. Conf. Comput. Vis. Pattern Recognit, (2016), pp. 1249-1258.

Zhang, Z., et al., "Rethinking Classification Loss Designs for Person Re-identification with a Unified View", ArXiv Prepr. ArXiv2006.04991, pp. 1-18, (2020).

Khan, A., et al., "Forensic Video Analysis: Passive Tracking System for Automated Person of Interest (POI) Localization", IEEE Access 6, pp. 43392-43403, (2018).

Waehrer, G.M., et al., "Costs of Occupational Injuries in Construction in the United States", Accident Analysis and Prevention, 39(6) (2007), pp. 1258-1266.

Szegedy, C., et al., "Rethinking the Inception Architecture for Computer Vision", Proc. IEEE Conf. Comput. Vis. Pattern Recognit., pp. 2818-2826, (2016).

Angah, O., et al., "Tracking multiple construction workers through deep learning and gradient based method with re-matching based on multi-object tracking accuracy", Automation in Construction, 119, 103308, 9 pages total, (2020).

Labor Department of the Government of HKSAR of China, Occupational Safety and Health Statistics, Issue No. 181, Hong Kong, 8 pages total, (2018).

Sun, Y, et al., Beyond Part Models: Person Retrieval with Refined Part Pooling (and A Strong Convolutional Baseline), in Proc. Eur. Conf. Comput. Vis., 2018, pp. 1-17.

Yan, C., et al., "Beyond Triplet Loss: Person Re-identification with Fine-grained Difference-aware Pairwise Loss", IEEE Transaction on Multimedia, vol. 24, pp. 1665-1677, (2022).

Ristani, E., et al., "Features for Multi-Target Multi-Camera Tracking and Re-identification", Proc. IEEE Comput. Soc. Conf. Comput. Vis. Patten Recognit., (2018) pp. 6036-6046.

Simonyan, K., et al., "Very Deep Convolutional Networks for Large-Scale Image Recognition", ArXiv Prepr. ArXiv1409.1556V6, pp. 1-14, (2015).

Zhai, Y., et al., "In Defense of the Classification Loss for Person Re-Identification", in: Proc. IEEE/CVF Conf. Comput. Vis. Pattern Recognit. Work., (10 pages total) 2019.

Seong, H., et al. "Vision-Based Safety Vest Detection in a Construction Scene", in M.-Y. (National T.U. of S. Cheng, Technology), H.-M. (National T,U, of S. Chen, Technology), K.C. (National T.U. of S. Chiu, Technology), (Eds.), Proc. 34th International Symposium on Automation and Robotics in Construction, Tirbun EU, s.r.p., Brno, Taipei, Taiwan, (ISARC 2017), (2017), pp. 288-293.

Wang, G., et al., "Learning Discriminative Features with Multiple Granularities for Person Re-Identification", in: Proc. 26th ACM Int. Conf. Multimed., pp. 274-282, (2018), Seoul Republic of Korea.

Chen, Y., et al., "Similarity Learning with Listwise Ranking for Person Re-Identification", in: 2018 25th IEEE Int. Conf. Image Process, (2018), pp. 843-847.

Ren, S., et al., "Faster R-CNN Towards Real-Time Object Detection with Region Proposal Networks", IEEE Trans Pattern Anal. Mach. Intell. 39, pp. 1-9, (2017).

Labor Department of the Government of HKSAR of China, Occupational Safety and Health Statistics, Hong Kong, 8 pages total (2019).

"Census of Fatal Occupational Injuries Illinois", 2019, Epidemiologic Report Series 21:01, State of Illinois, Department of Public Health 14 pages total.

Lou, H., et al., "Construction Machine Pose Prediction Considering Historical Motions and Activity Attributes Using Gated Recurrent Unit", (GRU), Automation in Construction, 121 (2021) 103444, 16 pages.

Hinze, J., et al., "An Evaluation of Safety Performance measures for Construction Projects", Journal of Construction Research, vol. 4, No. 1, pp. 5-15,(2003).

(56) References Cited

PUBLICATIONS

Pal, A., et al., "Deep-Learning-Based Visual Data Analytics for Smart Construction Management", *Automation in Construction*, 131 (2021) 103892, 22 pages.

Cheng, Jack, C.P., et al., "Automated detection of sewer Pipe defects in closed-circuit television images using deep learning techniques", *Automation in Construction*, 95, pp. 155-171, (2018).

Wang, M., et al., "A Unified Convolutional Neural Network Integrated with Conditional Random Field for Pipe Defect Segmentation", *Computer-Aided Civil and Infrastructure, Engineering, WILEY*, DOI:10,111/mice. 4015075, pp. 162-177, (2019).

Kim, Hongjo, et al., "Vision-Based Object-Centric Safety Assessment Using Fuzzy Interference: Monitoring Struck-by Accidents with Moving Objects", *J. Compt Civ. Eng.*, 30(4), (2016), pp. 4015075-1-4015075-13.

Tang, Shuai et al., "Video-Based Motion Trajectory Forecasting Method for Proactive Construction Safety Monitoring System", *J. Comput. Civ. Eng.*, 34(6), (2020), pp. 4020041-1-4020041-14.

Wu, D., et al., "Deep Learning-Based Methods for Person Re-Identification: A Comprehensive Review", *Neurocomputing*, 337, pp. 354-371, (2019).

Saez, J.A., et al., "Analyzing the Oversampling of Different Classes and Types of Examples in Multi-Class Imbalanced Datasets", *Pattern Recognition*, 57 (2016), pp. 164-178.

Dung. C.V., et al., "A Vision-Based Method for Crack Detection in Gusset Plate Welded Joints of Steel Bridges Using Deep Convolutional Neural Networks", *Automation in Construction*, 102 (2019) pp. 217-229.

Xiong, C., et al., "Automated Regional Seismic Damage Assessment of Building Using An Unmanned Aerial Vehicle and A Convolutional Neural Network", *Autom. Constr.* 109 (2020), 102994, 14 pages.

Malinovskiy, Y., et al., "Model-Free Video Detection and Tracking of Pedestrians and Bicyclists", *Computer-Aided Civil and Infrastructure Engineering*, 24, pp. 157-168 (2009).

Zheng, J., et al., "Detecting Cycle Failures at Signalized Intersections Using Video Image Processing", *Computer-Aided Civil and Infrastructure Engineering* 21, pp. 425-435, (2006).

Wong, Peter, Kok-Yiu, et al., "Recognition of pedestrian trajectories and attributes with computer vision and deep learning techniques", *Adv. Eng. Informatics*, 49, pp. 1-18, (2021), 101356.

Luo, X., et al., "Vision-based detection and visualization of dynamic workspaces", *Autom. Constr.* 104, pp. 1-13 (2019).

Konstantinou, E., et al., "Adaptive computer vision-based 2D tracking of workers in complex environments", *Autom. Constr.* 103, pp. 168-184 (2019).

Roberts, Dominic, et al., "Vision-Based Construction Worker Activity Analysis Informed by Body Posture", *J. Comput. Civ. Eng.* vol. 34(40), (2020), pp. 4020017-1-02020017-17.

Mignon, A., et al., "PCCA: A New Approach for Distance Learning from Sparse Pairwise Constraints", in *2012 IEEE Conf. Comput, Vis. Pattern Recognit.*, pp. 2666-2672.

Cheng, Eric D., et al., "Matching of Objects Moving Across Disjoint Cameras", in *2006 International Conference Image Processing*, vol. 1, pp. 1769-1772.

Dalal, N., et al., "Histograms of Oriented Gradients for Human Detection", in *2005 IEEE Comput. Soc. Conf. Comput. Vis. Pattern Recognit*, pp. 886-893.

Zhong, W., et al., "A part-based attention networks for person re-identification", *Multimed. Tools and Applications*, 79 (2020) pp. 22525-22549.

Wei, R., et al., "Recognizing people's identity in construction sites with computer vision: A spatial and temporal attention pooling network", *Adv. Eng. Informatics*. 42 (2019), 9 pages, 100981.

Rubaiyat, Abu, H.M., et al., "Automatic Detection of Helmet Uses for Construction Safety", in: *2016 IEEE/WIC/ACM Int.Conf.Web Intell. Work.* 2016, pp. 135-142.

Mneymneh, Bahaa E., et al., "Vision Based Framework for Intelligent Monitoring of Hardhat Wearing on Construction Sites", *J. Comput. Civ. Eng.* 33, pp. 1-20 (2019).

Tang, S., et al., "Human-object interaction recognition for automatic construction site safety inspection", *Autom. Constr.* 120 (2020) 103356, 16 pages.

Fang, Q., et al., "Detecting non-hardhat-use by a deep learning method from far-field surveillance videos", *Autom. Constr.* 85 (2018), pp. 1-9.

Memarzadeh, M., et al., "Automated 2D detection of construction equipment and workers from site video streams using histograms of oriented gradients and colors", *Autom. Constr.* 32, pp. 24-37 (2013).

Fang, W., et al. "Automated detection of workers and heavy equipment on construction sites: A convolutional neural network approach", Adv. Eng. Informatics, pp. 139-149, 37 (2018).

Brunetti, A., et al., "Computer vision and deep learning techniques for pedestrian detection and tracking: A survey", *Neurocomputing.*, vol. 300, pp. 17-33 (2018).

Wong, Peter, Kok-Yiu, et al., "Enriched and discriminative convolutional neural networks features for pedestrian re-identification and trajectory modeling", Computer-Aided *Comput. Civ. and Infratruct. Eng.* 36 (2021), pp. 573-592.

Han, J., et al., "Data mining: concept and techniques", Third Edition, *Elsevier*, 740 pages total, 2011.

Ristani, E., et al. "Performance Measures and a Data Set for Multi-target, Multi-camera Tracking", *Eur. Conf. Comput. Vis. Work.*, 2, pp. 17-35 (2016).

Chou, Yu-Sheng, et al., "Dynamic Gallery for Real-time Multi-Target Multi-Camera tracking", 2019, *16th IEEE Int. Con. Adv. Video Signal Based Surveillance*, AVSS 2019, pp. 1-8 (2019).

Farenzena, M., et al., "Person Re-Identification by Symmetry-Driven Accumulation of Local Features", *2010 IEEE Comput. Soc. Conf. Comput. Vis. Pattern Recognit.*, pp. 2360-2367 (2010).

Zhao, H., et al., "Spindle Net: Person Re-identification with Human Body Region Guided Feature Decomposition and Fusion", *Proc. 30th IEEE Conf. Comput. Vis. Pattern Recognition*, CVPR 2017, pp. 1077-1085 (Jan. 2017).

Wojke, N., et al., "Deep Cosine Metric Learning for Person Re-identification," in *2018 IEEE Winter Conf. Appl. of Comput. Vis.*, 2018, pp. 748-756.

Li, D., et al., "Learning Deep Context-Aware Features over Body and Latent Parts for Person Re-identification", in: *Proc. 30th IEEE Conf. Comput. Vis. Pattern Recognition*, CVPR 2017, pp. 384-393.

Huang, J., et al., "Speed/accuracy trade-offs for modem convolutional object detectors", *Proc.—30th IEEE Conf. Comput. Vis. Pattern Recognition*, CVPR 2017, 2017, pp. 7310-7319.

Nath, N.D., et al., "Deep Learning for Site Safety: Real-Time Detection of Personal Protective Equipment", *Autom. Constr.* 112 (2020) 103085, 20 pages.

Yrjanainen, J., et al., "Privacy-Aware Edge Computing System for People Tracking", *2020 IEEE International Conference on Image Process*, (2020), pp. 2096-2100.

Wong, P.K.-Y., et al., "Monitoring Pedestrian Flow on Campus with Multiple Cameras using Computer Vision and Deep Learning Techniques", *CIGOS 2019, Innov. Sustain. Infrastruct.*, Springer Nature Singapore, pp. 1149-1154 (2020).

\* cited by examiner

VISION-BASED MONITORING OF SITE SAFETY COMPLIANCE BASED ON WORKER RE-IDENTIFICATION AND PERSONAL PROTECTIVE EQUIPMENT CLASSIFICATION

CROSS-REFERENCE TO RELATED APPLICATIONS

This application claims the benefit of U.S. Provisional Application No. 63/289,142 titled "VISION-BASED MONITORING OF SITE SAFETY COMPLIANCE BASED ON WORKER RE-IDENTIFICATION AND PERSONAL PROTECTIVE EQUIPMENT CLASSIFICATION," filed Dec. 14, 2021, the entire contents of which is incorporated herein by reference.

BACKGROUND

The construction industry is one of the very hazardous industries, with high accident rates recorded in the past years. From 2013 to 2019, the construction industry in Hong Kong had the highest fatality rates every year among the 14 main industry sectors. The United States also reported that in 2019 about 20% of occupational fatalities occurred on construction sites. On-site accidents have led to significant financial losses among stakeholders, e.g. due to compensation claims, which necessitate systematic practices of site safety monitoring. Construction sites involve highly dynamic interactions between multiple workers and equipments (e.g. excavators, trucks). In particular, the major causes for the construction injuries and fatalities include collision with moving objects and falling from height. To avoid severe injuries, any unsafe behavior among workers should be identified and rectified. Examples include analyzing the on-site movements of workers and inspecting the proper wearing of personal protective equipment (PPE), the records of which can be logged into regular site diaries for review and behavioral analyses. The traditional practices of site safety monitoring mainly involve on-site safety officers for manually observing the behavior and job operations of workers. Yet, continuously monitoring workers scattered over a large site is labor-intensive and error-prone, where unsafe behavior may be overlooked.

To this end, automated processing of surveillance camera videos can potentially facilitate site monitoring. Surveillance cameras have been commonly deployed for various purposes, e.g. identifying criminal suspects in public areas like airports. By incorporating computer vision and deep learning techniques into video processing, the visual content on video frames can be automatically interpreted. Taking supervised learning as an example, a deep convolutional neural network (CNN) is trained with images, the desired outputs of which are manually labeled, such that the network learns to extract useful features from the images for various tasks, such as object detection and classification. These techniques have also been applied in civil engineering, for example, in defect detection for structural health assessment, monitoring of construction sites such as location tracking and activity classification of workers and equipment on sites, site accident monitoring, and productivity evaluation. Some studies also focused on identifying whether workers wear the necessary PPEs, e.g., safety helmets and reflective vests.

Nevertheless, existing studies only monitor individual workers within a small sub-region captured by a single camera. However, the movement of workers cannot be continuously tracked over the whole site. Since workers typically move around in different areas of a site, continuous tracking of workers across a wide-area would enable more comprehensive behavioral analyses and safety monitoring. Thus, there is a need for improving image processing techniques for use, among other applications, in monitoring individual workers on a wider regional scale.

SUMMARY

In an exemplary embodiment, the present disclosure provides a system for monitoring safety compliance. The system for monitoring safety compliance comprises a plurality of cameras and a computing system. The plurality of cameras are configured to obtain data. The data comprises multiple images associated with one or more objects. The computing system is configured to process the data to determine the safety compliance of the one or more objects associated with the multiple images based on implementing a first model trained for re-identification. The computing system is further configured to train the first model for re-identification. Training of the first model for re-identification comprises obtaining a first set of images, determining a similarity matrix comprising similarity scores for image pairs among the first set of images based on features extracted from the images using the first model, determining a ground-truth similarity matrix comprising ground-truth similarity scores for the image pairs among the first set of images based on identities labeled on the set of images, determining a comparison matrix by performing element-wise comparison between the similarity matrix and the ground-truth similarity matrix, determining a similarity loss based on an element with a maximum value in the comparison matrix, and updating the first model based on the similarity loss. Each image in the first set of images comprises an object and is labeled with the identity associated with the object.

In a further exemplary embodiment, the ground-truth similarity scores for the image pairs among the first set of images are determined based on a smoothing parameter P, wherein P is adjustable between zero and one.

In a further exemplary embodiment, each pair of images with the same identity is assigned with P as the respective ground-truth similarity score, and wherein each pair of images with different identities is assigned with 1−P as the respective ground-truth similarity score.

In a further exemplary embodiment, each pair of images among the first set of images comprises a first image and a second image. Determining the similarity matrix comprising similarity scores for image pairs among the first set of images further comprises determining a first feature vector for the respective first image and a second feature vector for the respective second image for each pair of images, determining a cosine similarity as the similarity score for the respective pair of images based on the first feature vector and the second feature vector. The cosine similarity is obtained by dividing the product of the first feature vector and the second feature vector by the absolute values of the first feature vector and the second feature vector.

In a further exemplary embodiment, determining the comparison matrix by performing element-wise comparison between the similarity matrix and the ground-truth similarity matrix further comprises determining an absolute difference or a squared difference between each similarity score in the similarity matrix and a corresponding ground-truth similarity score in the ground-truth similarity matrix. The respective similarity score and the corresponding ground-truth similarity score are associated with the same respective pair of images.

In a further exemplary embodiment, the computing system is further configured to train a second model for classification. Training the second model for classification comprises receiving a second set of images associated with multiple classes, determining a total number of images in each class among the multiple classes, determining a first class among the multiple classes with a maximum number of images, determining a weight associated with the respective class based on a ratio of the maximum number of images in the first class to a number of images in a class among the multiple classes, and updating the second model based on the weights associated the multiple classes per iteration. Each image in the second set of images is labeled with a class.

In a further exemplary embodiment, the weight associated with a respective class is assigned to all the images in the respective class during the training of the second model. Computation of loss per iteration is based on the weights associated with the images in the second set of images.

In a further exemplary embodiment, processing the data to determine the safety compliance of the one or more objects associated with the multiple images further comprises identifying the one or more objects based on features extracted from the multiple images in the data by using the first model, classifying the one or more objects based on the features extracted from the multiple images in the data by using the second model, and determining the safety compliance for the one or more objects based on the identification and classification results.

In a further exemplary embodiment, the identification and classification results comprise the multiple images, and each image among the multiple images is associated with a timestamp, an identity, and a safety status. The computing system is further configured to determine a subset of images among the multiple images as being associated with an incident. The subset of images are in a class indicating a non-compliant safety status. The subset of images are associated with a time period greater than or equal to a minimum buffer time threshold. The subset of images include one or more time gaps. Each time gap is shorter than a time gap threshold.

In a further exemplary embodiment, the computing system is further configured to generate a log comprising detected incidents, and generate warnings corresponding to the detected incidents. The warnings comprise any of a warning message, an alarm, a flashing light.

In another exemplary embodiment, the present disclosure provides a method for monitoring safety compliance. The method comprises obtaining data from a plurality of cameras by a computing system, and processing the data to determine the safety compliance of one or more objects associated with multiple images based on implementing a first model trained for re-identification. The data comprises the multiple images associated with the one or more objects. The first model is trained for re-identification based on obtaining a first set of images, determining a similarity matrix comprising similarity scores for image pairs among the first set of images based on features extracted from the images using the first model, determining a ground-truth similarity matrix comprising ground-truth similarity scores for the image pairs among the first set of images based on identities labeled on the set of images, determining a comparison matrix by performing element-wise comparison between the similarity matrix and the ground-truth similarity matrix, determining a similarity loss based on an element with a maximum value in the comparison matrix, and updating the first model based on the similarity loss. Each image in the first set of images comprises an object and is labeled with an identity associated with the object.

In a further exemplary embodiment, the method further comprises training of a second model for classification. Training the second model for classification comprises receiving a second set of images associated with multiple classes, determining a total number of images in each class among the multiple classes, determining a first class among the multiple classes with a maximum number of images, determining a weight associated with the respective class based on a ratio of the maximum number of images in the first class to a number of images in a class among the multiple classes, and updating the second model based on the weights associated the multiple classes per iteration. Each image in the second set of images is labeled with a class.

In a further exemplary embodiment, the weight associated with a respective class is assigned to all the images in the respective class during the training of the second model. Computation of loss per iteration is based on the weights associated with the images in the second set of images.

In a further exemplary embodiment, processing the data to determine the safety compliance of the one or more objects associated with the multiple images further comprises identifying the one or more objects based on features extracted from the multiple images in the data by using the first model, classifying the one or more objects based on the features extracted from the multiple images in the data by using the second model, and determining the safety compliance for the one or more objects based on the identification and classification results.

In a further exemplary embodiment, the identification and classification results comprise the multiple images, and each image among the multiple images is associated with a timestamp, an identity, and a safety status. The method further comprises determining a subset of images among the multiple images as being associated with an incident. The subset of images are in a class indicating a non-compliant safety status. The subset of images are associated with a time period greater than or equal to a minimum buffer time threshold. The subset of images include one or more time gaps. Each time gap is shorter than a time gap threshold.

In yet another exemplary embodiment, the present disclosure provides a non-transitory computer-readable medium having processor-executable instructions stored thereon for monitoring safety compliance using a computing system. The computing system executes the instructions to facilitate obtaining data from a plurality of cameras, and processing the data to determine the safety compliance of one or more objects associated with multiple images based on implementing a first model trained for re-identification. The data comprises the multiple images associated with the one or more objects. The first model is trained for re-identification based on obtaining a first set of images, determining a similarity matrix comprising similarity scores for image pairs among the first set of images based on features extracted from the images using the first model, determining a ground-truth similarity matrix comprising ground-truth similarity scores for the image pairs among the first set of images based on identities labeled on the set of images, determining a comparison matrix by performing element-wise comparison between the similarity matrix and the ground-truth similarity matrix, determining a similarity loss based on an element with a maximum value in the comparison matrix, and updating the first model based on the similarity loss. Each image in the first set of images comprises an object and is labeled with an identity associated with the object.

In a further exemplary embodiment, the computing system executes the instructions to further facilitate training of a second model for classification. Training the second model for classification comprises receiving a second set of images associated with multiple classes, determining a total number of images in each class among the multiple classes, determining a first class among the multiple classes with a maximum number of images, determining a weight associated with the respective class based on a ratio of the maximum number of images in the first class to a number of images in a class among the multiple classes, and updating the second model based on the weights associated the multiple classes per iteration. Each image in the second set of images is labeled with a class.

In a further exemplary embodiment, the weight associated with a respective class is assigned to all the images in the respective class during the training. Computation of loss per iteration is based on the weights associated with the images in the second set of images.

In a further exemplary embodiment, processing the data to determine the safety compliance of the one or more objects associated with the multiple images further comprises identifying the one or more objects based on features extracted from the multiple images in the data by using the first model, classifying the one or more objects based on the features extracted from the multiple images in the data by using the second model, and determining the safety compliance for the one or more objects based on the identification and classification results.

In a further exemplary embodiment, the identification and classification results comprise the multiple images, and each image among the multiple images is associated with a timestamp, an identity, and a safety status. The computing system executes the instructions to further facilitate determining a subset of images among the multiple images as being associated with an incident. The subset of images are in a class indicating a non-compliant safety status. The subset of images are associated with a time period greater than or equal to a minimum buffer time threshold. The subset of images include one or more time gaps. Each time gap is shorter than a time gap threshold.

BRIEF DESCRIPTION OF THE DRAWINGS

The present systems and methods for monitoring safety compliance are described in detail below with reference to the attached drawing figures, wherein.

DETAILED DESCRIPTION

System and methods are disclosed related to a vision-based framework for monitoring safety compliance among workers. The framework combines algorithms for re-identification (ReID) of workers and classification of personal protective equipment (PPE). Deep learning-based approaches are implemented to address challenges in the aforementioned two tasks. With respect to the task of ReID, a new loss function, named similarity loss, is designed to encourage deep learning models to learn more discriminative human features, realizing a more robust tracking of individual workers. With respect to the task of classification, a weighted-class strategy is used to mitigate model bias when given imbalanced samples among classes, for improved performance of classifying PPE statuses on the identified workers despite limited training samples. By combining the ReID and PPE classification results, a workflow is developed to log any incident of workers not wearing the necessary PPEs.

When applied to analyze an actual construction site dataset, exemplary implementations of the present disclosure were able to achieve significantly improved accuracies of worker ReID and PPE classification over conventional techniques by facilitating site video analytics and inspection of site safety compliance among workers.

Figure 1A:
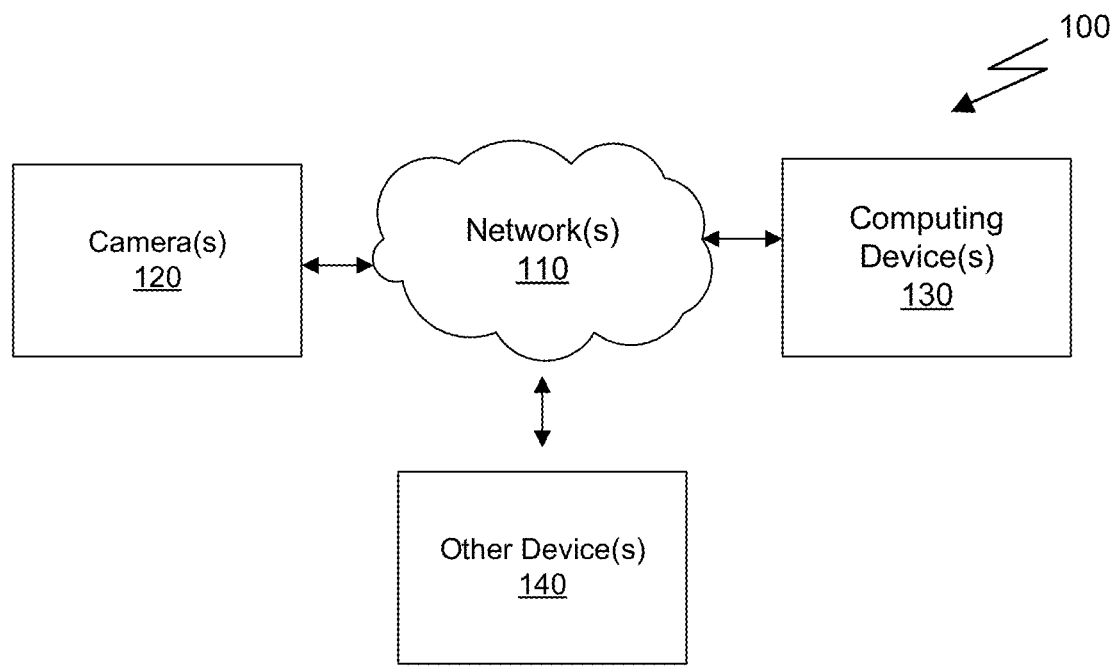
FIG. 1A illustrates a network environment for implementing techniques in the present disclosure, in accordance with some embodiments.

FIG. 1A illustrates a network environment 100 for implementing techniques in the present disclosure, in accordance with some embodiments.

Network environments suitable for use in implementing embodiments of the disclosure may include one or more cameras 120, computing devices 130 and/or other devices 140. By way of example and not limitation, a camera 120 may be embodied as an imaging device, such as a video camera, a surveillance device/system, etc., or an imaging module integrated in an electronic device/system, such as a smartphone, an autonomous vehicle, a drone, a robot, etc. Computing devices 130 may include one or more client devices, one or more servers or a combination thereof. Examples of a computing device 130 may include but not limited to a Personal Computer (PC), a laptop computer, a workstation, etc. Other devices 140 may include network attached storage (NAS), other backend devices, or any other suitable device.

Components of a network environment 100 may communicate with each other via network(s) 110, which may be wired, wireless, or both. Network(s) 110 may include multiple networks, or a network of networks. By way of example, network(s) 110 may include one or more Wide Area Networks (WANs), one or more Local Area Networks (LANs), one or more public networks such as the Internet and/or a public switched telephone network (PSTN), and/or one or more private networks. Where network(s) 110 includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment 100 may include one or more cloud-based network environments, a distributed computing environment, a combination thereof, etc. A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

Figure 1B:
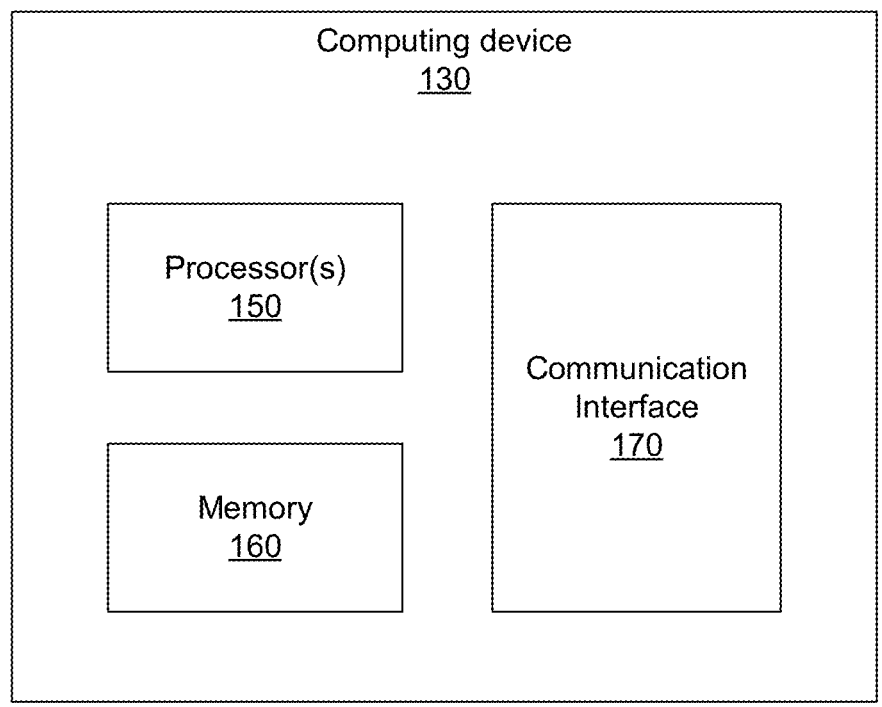
FIG. 1B is block diagram of an exemplary computing device configured to implement various functions, in accordance with some embodiments.

FIG. 1B is a block diagram of an exemplary computing device 130 configured to implement various functions in accordance with some embodiments in the present disclosure. A computing system may include one or more computing devices 130 and other suitable devices/components.

As shown in FIG. 1B, computing device 130 may include one or more processors 150, a communication interface 170, and a memory 160. The processor(s) 150 may be configured to perform the operations in accordance with the instructions stored in memory 160. The processor(s) 150 may include any appropriate type of general-purpose or special-purpose microprocessor, such as central processing unit (CPU), graphic processing unit (GPU), parallel processing unit (PPU), etc. The memory 160 may be configured to store computer-readable instructions that, when executed by the processor(s) 150, can cause the processor(s) 150 to perform various operations disclosed herein. The memory 160 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

The communication interface 170 may be configured to communicate information between the computing device 130 and other devices or systems, such as the camera(s) 120, another computing device 130 or the other device(s) 140 as show in FIG. 1A. For example, the communication interface 170 may include an integrated services digital network ("ISDN") card, a cable modem, a satellite modem, or a modem to provide a data communication connection. As another example, the communication interface 170 may include a local area network ("LAN") card to provide a data communication connection to a compatible LAN. As a further example, the communication interface 170 may include a high-speed network adapter such as a fiber optic network adaptor, 10G Ethernet adaptor, or the like. Wireless links can also be implemented by the communication interface 170. In such an implementation, the communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like.

The communication interface 170 may also include various I/O devices such as a keyboard, a mouse, a touchpad, a touch screen, a microphone, a camera, a biosensor, etc. A user may input data to the computing device 130 (e.g., a terminal device) through the communication interface 170.

In some embodiments, a display may be integrated as part of the computing device 130 or may be provided as a separate device communicatively coupled to the computing device 130. The display may include a display device such as a Liquid Crystal Display ("LCD"), a Light Emitting Diode Display ("LED"), a plasma display, or any other type of display, and provide a Graphical User Interface ("GUI") presented on the display for user input and data depiction. In some embodiments, the display may be integrated as part of the communication interface 170.

Figure 2A:
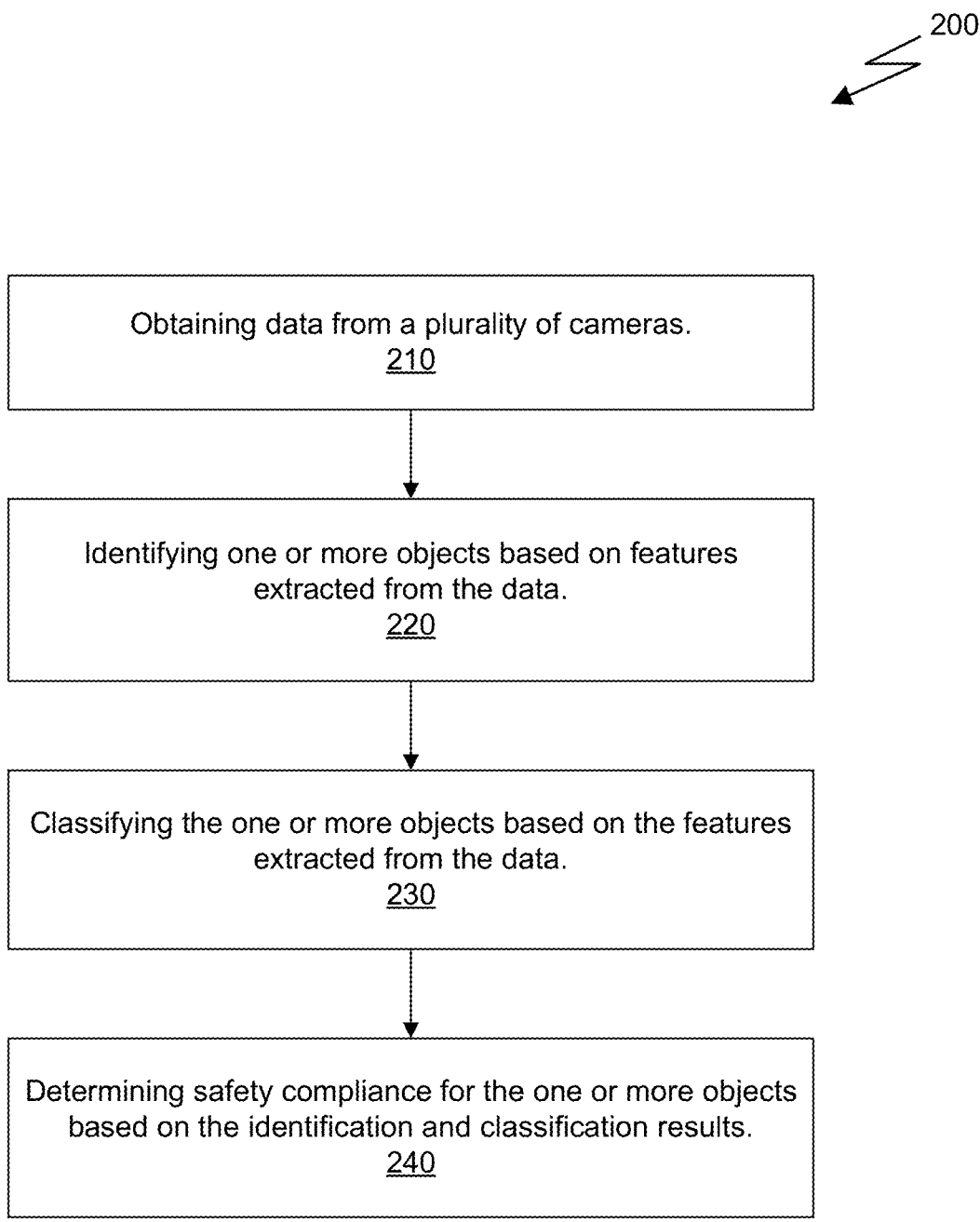
FIG. 2A is a flowchart of a method for monitoring of site safety compliance, in accordance with some embodiments.
Figure 2B:
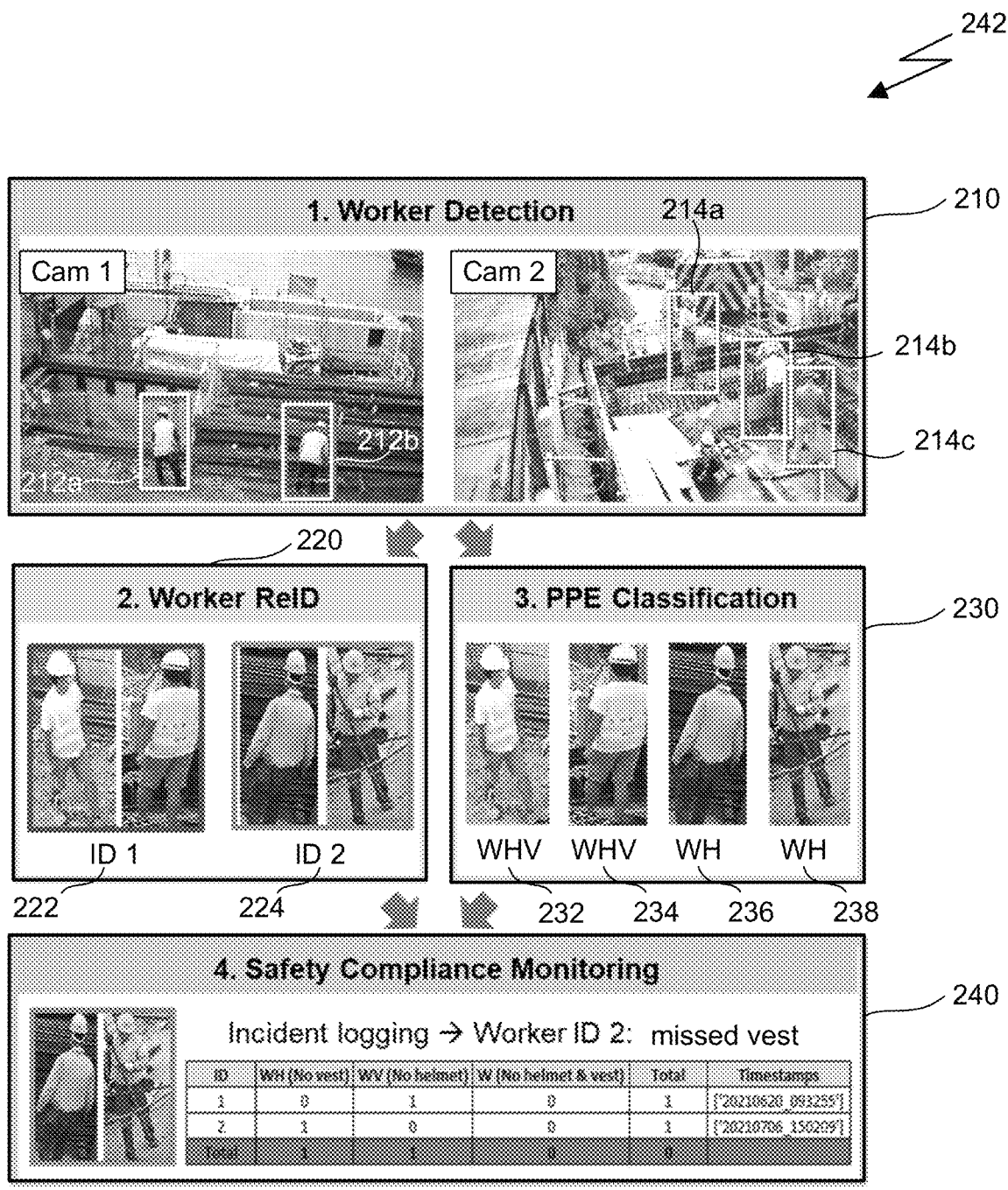
FIG. 2B demonstrates an example of performing the method for monitoring of site safety compliance as shown in FIG. 2A, in accordance with some embodiments.

FIG. 2A is a flowchart of a method 200 for monitoring of site safety compliance, in accordance with some embodiments. The method 200 may be performed by a system including multiple cameras 120, one or more computing devices 130, and other suitable devices as shown in FIG. 1A/1B, which may be set up in a network environment 100 as shown in FIG. 1A. It will be recognized that the method 200 may be performed in any suitable environment and that any of the blocks in FIG. 2A may be performed in any suitable order. FIG. 2B demonstrates an exemplary process 242 of performing the method 200 as shown in FIG. 2A.

At step 210, the computing device 130 obtains data from one or more cameras 120.

Figure 3:
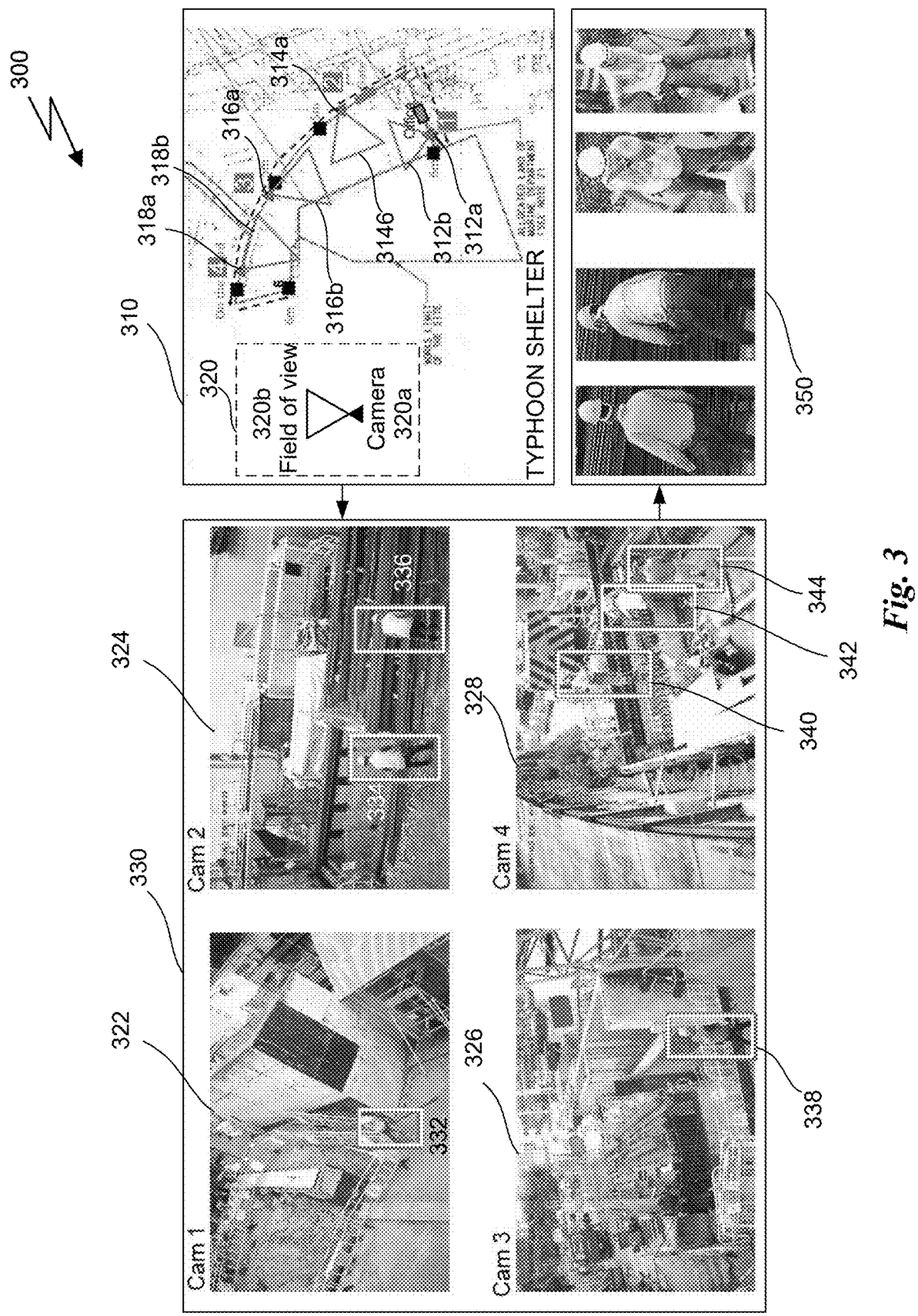
FIG. 3 illustrates a flowchart of obtaining images for monitoring of site safety compliance, in accordance with some embodiments.

The one or more cameras 120 may be allocated at multiple locations on a site. Each camera 120 may provide a coverage of the site corresponding to the field of view of the camera 120. FIG. 3 illustrates a flowchart 300 of obtaining images for monitoring of site safety compliance, in accordance with some embodiments. An exemplary layout of multiple cameras on a site is demonstrated in block 310. As shown in the legend 320, a camera 320a is represented by a solid triangle, the field of view 320b of the camera is represented by a hollow triangle. In this example, four cameras are placed at different locations on the site. Each camera may be assigned with a unique camera number (or index), such as Cam 1 for camera 312a. Camera 312a (Cam 1) has a field of view 312b, camera 314a (Cam 2) has a field of view 314b, camera 316a (Cam 2) has a field of view 316b, and camera 318a (Cam 2) has a field of view 318b. Each camera 120 may obtain a video stream, which includes a stack of raw images (video frames), for the corresponding location. The cameras 120 may send data including the video streams to the computing device 130 via the network environment 100. Additionally, each raw image may be associated with a timestamp indicating the moment of capturing the image and a camera number indicating the camera that captures the image. Block 330 in FIG. 3 show four raw images 322, 324, 326, and 328 from the four cameras Cam 1, Cam 2, Cam 3, and Cam 4, respectively. Each of the raw images may capture one or more objects of interest, such as workers in this example.

The computing device 130 may implement various object recognition algorithms to detect objects in the raw images. In an embodiment, one or more bounding boxes may be overlaid on each of the raw images to encapsule the detected object(s) in the raw image. For instance, a bounding box may represent a detection of a person, which includes a subset of pixels in a raw image. As shown in FIG. 3, in the image 322, the computing device 130 may detect one person and encapsuled the detected person by a bounding box 332. Similarly, the computing device 130 may generate bounding boxes 334, 336 in the image 324, a bounding box 338 in the image 326, and bounding boxes 340, 342, and 344 in the image 342.

In further embodiments, the computing device 130 may adjust the size of each bounding box by cropping the portion of raw image around an object (e.g., a worker) with minimal background clutter, thereby reducing background noises. This may be automated by firstly generating a rectangular bounding box around each object, and then cropping each bounding box to remove pixels in the raw image that are irrelevant to the object.

Hereinafter, the term "image" refers to a portion of an image corresponding to a bounding box, which is cropped from a raw image.

The computing device 130 may perform feature extraction on the images to identify objects across the plurality of cameras and result in grouped images as shown in block 350, which will be described in detail in later steps of the method 200.

Figures 4, 5:
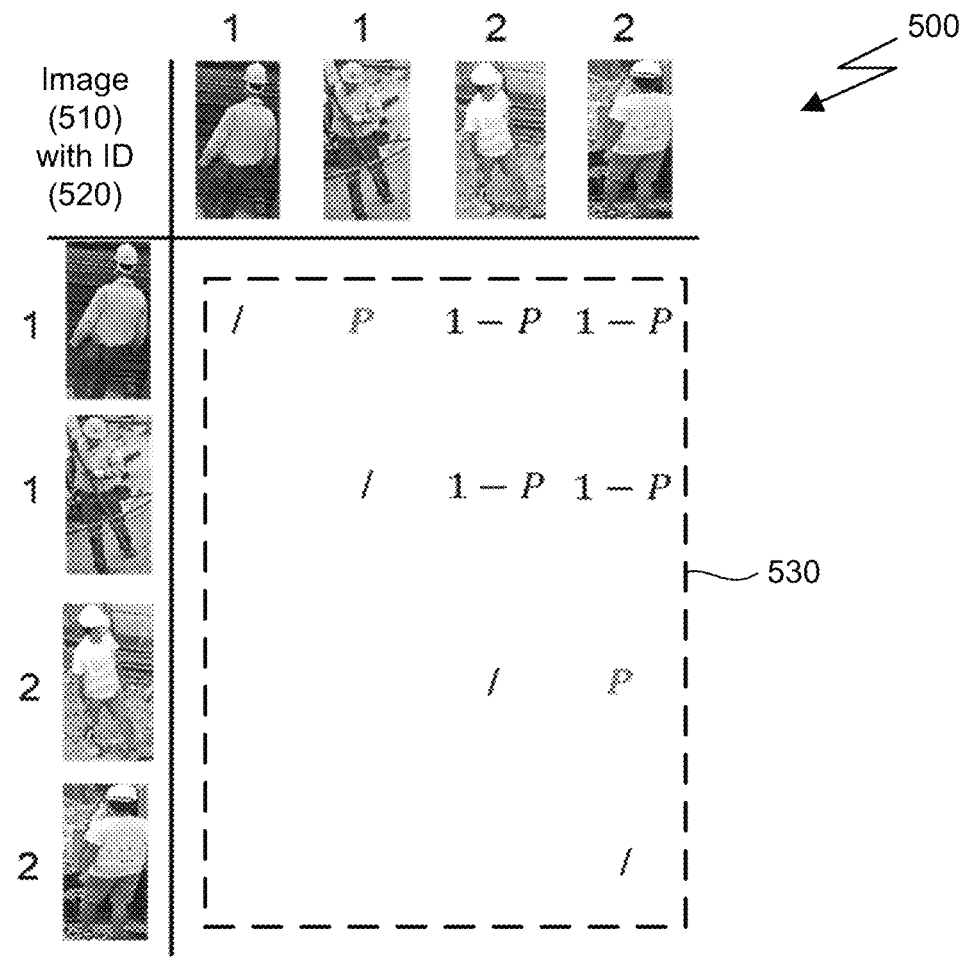
FIG. 4 is a table presenting exemplary data obtained for monitoring of site safety compliance, in accordance with some embodiments.
FIG. 5 demonstrates an exemplary similarity matrix, in accordance with some embodiments.

In FIG. 2B, block 210 demonstrates exemplary results by performing step 210 of the method 200 using the computing device 130. In this example, the computing device 130 may obtain raw images from Cam 1 and Cam 2. Then, the computing device 130 may generate images 212a and 212b for the identified objects in the raw image from Cam 1, and images 214a, 214b, and 214c for the identified objects in the raw image from Cam 2. In a further embodiment, the computing device 130 may associate information corresponding to the raw images, such as timestamps and camera indices, to the generate images. FIG. 4 is a table 400 presenting exemplary data obtained for monitoring of site safety compliance. The table 400 includes images 410 generated by the computing device 130 and corresponding information of timestamp 420 and camera index 430.

Referring back to FIG. 2A, at step 220, the computing device 130 identifies one or more objects based on features extracted from the data. The computing device 130 may process the images obtained from step 210 to extract features related to each of the detected objects. By finding similarities of the extracted features, the computing device 130 may group the images with similar features, so as to identify each object across multiple cameras 120. Block 220 in FIG. 2B shows exemplary results by performing step 220, in which the images generated for the detected workers are grouped based on similarity of features and each group is assigned with a unique identify (ID), such as ID 1 222 and ID 2 224 in this example. In this way, the computing device 130 may identify a first worker corresponding to ID 1 222 and a second worker corresponding to ID 2 224 across multiple cameras 120.

Generally, tracking multiple people across multiple cameras can be formulated into a person re-identification (ReID) problem. Given videos from different cameras with non-overlapping fields of view, the computing device 130 may first detect the captured people in each frame and generate images corresponding to the detected people, e.g., as bounding boxes cropped from the raw image. The computing device 130 may then process the images by using a ReID model, which extracts discriminative human features from each person and determines feature similarities between the images. The computing device 130 may match the same identity and differentiate different identities among the images based on the feature similarities. In this way, the ReID model may be used for determining consistent identities across multiple cameras 120.

Previous studies of ReID have encountered several technical challenges, which can be categorized into two aspects. The first aspect is intra-person appearance variation. When the same person is captured at different locations, the appearances of the person may largely vary due to changes of the view angle, clothing, lighting conditions or partial occlusion of the human body. Identities may be lost if the extracted features are sensitive to such variations. The second aspect is inter-person appearance ambiguity. When an arbitrary group of people are captured, they may have very similar visual features, such as clothing color, style and certain belongings. Identities may be confused if relying on some generic feature descriptors that are not distinctive enough. In view of these technical challenges, there is a need for developing robust ReID methods, which can extract identity-discriminative visual features.

In an embodiment, the computing device 130 may implement a ReID model to perform feature extraction on each detected worker, from which discriminative human features may be exploited for matching the worker identities across multiple cameras and differentiating different workers. The computing device 130 may use the ReID model to determine a feature vector to represent features in each image. The feature vector may include a plurality of elements, each of which may correspond to a feature map used in the ReID model for filtering out one specific feature from an image. As such, the computing device 130 may perform the feature extraction process to obtain the feature vectors for the images obtain from step 210 of the method 200. Then, the computing device 130 may compare the feature vectors so as to directly quantify the visual similarities among the workers in the images for identity matching. Many studies have proposed different ReID models, where the recent works mostly designed novel convolutional neural network (CNN) architectures to extract discriminative features. Yet, development of loss functions for facilitating the model training process is relatively under-explored, which is crucial to regulating the learning process of feature representation.

In an embodiment, a loss function, referred to as "similarity loss," may be implemented in the ReID model to facilitate an effective training process of the ReID models, i.e., by learning more discriminative human features. By ways of implementing a loss function with similarity loss, a ReID model may be trained to minimize errors in determining similarities between image pairs. Image pairs may be classified into two types. A positive pair may include two images associated with the same identity. A negative pair may include two images associated with different identifies. The ReID model may be trained to generate a similarity score for each pair of images. Intuitively, the similarity score for a positive pair is expected to be high, whereas the similarity score for a negative pair is expected to be low. The similarity loss may be used to directly incorporate the computed similarity scores among different images into the training objective, such as the loss function. In this way, the ReID model may be guided to learn features that can output reasonable similarity scores among positive and negative pairs. The formulation of similarity loss will be described in detail hereinafter.

In an exemplary training process, a set of training images and ground-truth similarity labels (or ground-truth similarities) for image pairs among the training images may be provided to train a model to learn consistent similarities. The model may generate similarity scores for the image pairs, which are compared against the ground-truth similarity labels in a stage of computing losses using a loss function with similarity loss. The learnable parameters in the model may be adjusted based on the computed losses. Through the learning of the similarities among the set of training images, the model may be encouraged by the ground-truth information to output high similarity scores among positive pairs, and low scores among negative pairs.

In one example, a similarity score may be considered as a probability value ranging between 0 and 1, i.e. all positive pairs have a similarity score of 1.0 while the negative pairs have a score of 0.0. Such a formulation of ground-truth similarities may be used to force a model to learn an aggressive feature representation, which maximizes, as much as possible, the relative similarity differences between positive and negative pairs. To this end, the model may learn discriminative human features that can confidently match the same worker with a similarity score of 1.0 and differentiate different workers with a score of 0.0.

Yet, the aforementioned settings of similarity scores for positive and negative pairs may potentially cause problems in some situations, where some redundant or even unrelated features may be exploited to produce the ground-truth similarities, causing misleading results of identity matching. For example, if attending to some background clutter like steel bars rather than the worker of interest, different identities may be wrongly matched due to the similar background.

From another perspective, the labeling of similarity scores among positive and negative samples may be analogous to the labeling process of object classification, i.e., distributing the ground-truth probabilities among positive and negative classes. For instance, among K number of possible class labels for an image, a straightforward one-hot label (including a group of bits with a single "1" bit and all others low "0" bits) gives the positive class a probability of 1.0, while all other negative classes have a probability of 0.0. However, making such a large relative difference may lead to overfitting, since a model is forced to learn features that vigorously increase the confidence of its predicted class label. Certain unrelated features may consequently be learned, which may not generalize well beyond the training images.

In an example, the label smoothing technique described by Szegedy et al. in "Speed/accuracy trade-offs for modern convolutional object detectors" (published at Proc.—30th IEEE Conf. Comput. Vis. Pattern Recognition, CVPR 2017, 2017: pp. 3296-3305), which is incorporated herein by reference in its entirety, can be used to mitigate the chances of learning misleading features as discussed-above. The label smoothing technique extracts a small portion of probability and uniformly distributes to all negative classes. To illustrate as an example, a dataset may include five classes, with one ground-truth class and the rest being negative classes (e.g., including images associated with different identities). In this example, 10% of the total probability may be extracted from the ground-truth class, resulting in each of the four remaining negative classes receiving a 2.5% probability label. This may effectively regularize the training process, such that a model may be prevented from learning misleading features.

In a further example, as inspired by the label smoothing technique, a smoothing parameter P may be incorporated in the formulation of the similarity loss, allowing for a more flexible definition of similarity labels. FIG. 5 is an example of a similarity matrix 500 including similarity labels generated between multiple pairs of training images. Each training image 510 is associated with an ID 520. Ground-truth similarity labels may be generated based on the IDs 520 associated with the training images 510. The similarity labels between image pairs are presented in a field 530 in the similarity matrix 500. As shown the field 530, no similarity labels are generated for a pair of identical images, image pairs including two different images with the same ID are given P as the similarity labels, and image pairs including two different images with different IDs are given 1−P as the similarity labels.

Similarly, in a pair-wise similarity matrix of a batch of B images, each of the positive pairs is labeled with a similarity score P (a decimal between 0 and 1), while each of the negative pairs is labeled with a similarity score 1−P. It should be noted that different P values may be used in a similarity matrix for different image pairs. In this way, every similarity label has a finite range between 0 and 1. Essentially, the smoothing parameter P can control the relative difference in the ground-truth similarities between positive and negative pairs. For example, if P is reduced to 0.7, the positive and negative pairs have ground-truth similarities of 0.7 and 0.3, respectively, resulting in a much smaller relative difference than labeling with 1.0 and 0.0. Additionally, the smoothing parameter P may be tuned to achieve different effects on the model training. By defining P as the ground-truth similarity of positive pairs, the similarity loss is made generic and adaptable to different ReID scenes upon adjusting the smoothing parameter P.

The generation of similarity labels for the set of training images may be automatic, by comparing whether the identity labels of each image pair are the same or different. As such, the pair-wise B×B similarity matrix for the batch of B images among the set of training images may be formed, which may then constitute the ground-truth of the batch during training, thereby guiding a ReID model to exploit features that best replicate the ground-truth similarity scores among the training images.

With the ground-truth similarity labels generated, the training images may be fed into a ReID model for feature representation learning. A paradigm of supervised learning for a deep CNN may be adopted. During the training, the ReID model may generate an output and compute deviation of the output from the ground-truth as a training loss via forward propagation, and then iteratively update the learnable parameters in the model via backward propagation. A CNN architecture for ReID tasks may include a backbone model, which may include several convolutional, pooling and fully connected layers, for exploiting hidden features from the images. The backbone model may generate a feature vector for each image. Elements in the feature vector may represent the features extracted from the image. The dimension of the feature vector, that is the number of elements in the feature vector, may depend on the model architecture of the CNN. In some instances, the backbone model may process B images per batch and generate B number of feature vectors corresponding to the images in the batch. Subsequently, the ReID model may evaluate visual similarities among the B number of images by correlating the corresponding B number of feature vectors. More specifically, a B×B pair-wise similarity matrix may be computed among the feature vectors, which may be compared with a ground-truth similarity matrix.

Figure 6:
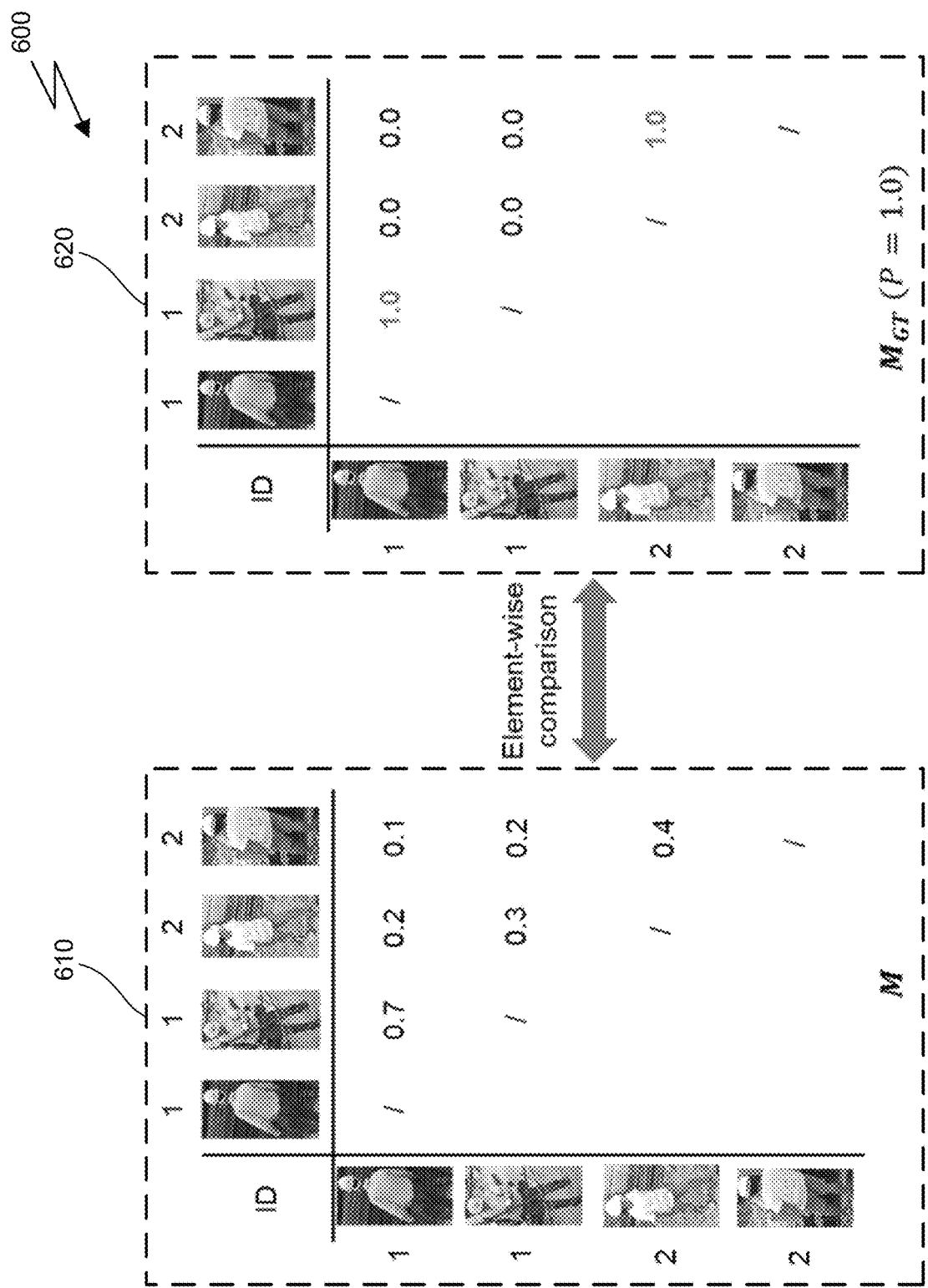
FIG. 6 demonstrates an element-wise comparison between a similarity matrix generated by a ReID model and a ground-truth similarity matrix, in accordance with some embodiments.

FIG. 6 demonstrates an element-wise comparison 600 between a similarity matrix (M) 610 generated by a ReID model and a ground-truth similarity matrix ($M_{GT}$) 620. The element-wise comparison 600 is to compare a generated similarity label (or a similarity score) for each image pair with a ground-truth similarity label for the image pair. An element in a similarity matrix may be inquired by a set of indices (i,j), where i is a row index and j is a column index. In this example, P is set to be 1.0 for positive pairs in the ground-truth similarity matrix 620.

Various metrics can be applied to compute the similarity scores. In one formulation, cosine similarity may be adopted, which benefits the computation of similarity loss by enforcing the similarity scores to be in a finite range between 0 and 1. As such, the range of the similarity scores aligns with the defined range of the similarity labels. Each element (i,j) in the similarity matrix may be computed by, $$\text{cosine similarity } (i, j) = \frac{f_i \cdot f_j}{\|f_i\| \times \|f_j\|} \text{ if } i \neq j, \text{ else Null,} \quad \text{(Eq. 1)}$$

where $f_i$ and $f_j$ represent feature vectors corresponding to the $i^{th}$ and $j^{th}$ images arranged in the similarity matrix, respectively. By applying Equation 1, the cosine similarity between feature vectors $f_i$ and $f_j$ may be computed. Since all elements along the diagonal axis denote the self-similarity of a feature vector itself (which are always 1.0 due to the equivalence), these elements are ignored when computing the similarity loss. In this way, two similarity matrices, such as M 610 and $M_{GT}$ 620 as shown in FIG. 6, may be compared during the training of the ReID model with the similarity loss.

The following illustrates an example of training a ReID model implemented in a computing device 130. It will be recognized that the computing device 130 may perform the steps described in this example in any suitable environment and in any suitable order. First, the computing device 130 may compute the matrix M 610 via the forward propagation of the ReID model. Second, the computing device 130 may generate the matrix $M_{GT}$ 620 as the ground-truth similarity matrix. Third, the computing device 130 may compute the similarity loss by applying, $$\text{similarity loss} = \max((M - M_{GT})^2). \quad \text{(Eq. 2)}$$

Then, the computing device 130 may perform the backward propagation for model updating based on the similarity loss calculated according to Equation 2. Specifically, the computing device 130 may generate element-wise squared differences between the matrices M 610 and $M_{GT}$ 620, which can form a comparison matrix with the same dimension as that of the matrices M 610 and $M_{GT}$ 620. The comparison matrix captures how much the generated/predicted similarity scores of the image pairs deviate from the corresponding ground-truth values. Subsequently, the computing device 130 may extract the largest value in the comparison matrix by applying the max( ) operation. As such, the computing device 130 may obtain the similarity loss value among a batch of training images, which is defined as the maximum deviation of the similarity scores. The formulation of the loss function may guide the ReID model to learn feature representations that gradually reconstruct the ground-truth similarity scores. To this end, the computing device 130 may be able to determine higher similarity among positive pairs, and lower among negative ones. Compared with commonly used softmax loss that formulates ReID training as a classification task, the training objective of the similarity loss better aligns with the testing process of ReID tasks, such that the ReID model receives more direct supervision during its training process.

Furthermore, as show in Equation 2, the differences between the two matrices are squared so as to evaluate the absolute magnitudes. Other variants, such as absolute differences, may be implemented in Equation 2 for calculation of the similarity loss. In addition, the max( ) operation effectively suppresses the deviation of the ReID model's outputs from the ground-truth values. The max( ) operation may be replaced by other variants, such as a mean( ) operation. For example, a mean( ) operation may be implemented in Equation 2 to take an averaged deviation among all image pairs in a batch.

In the testing stage, the computing device 130 may process the feature vectors that are extracted by the trained ReID model, and associate workers' identities with the images based on the feature vectors, which should be consistent across different images and different cameras. In other words, the computing device 130 may give a unique identity to all the images of the same worker, and meanwhile differentiate different workers. The task of identity matching is formulated as a clustering problem based on the extracted feature vectors. Various algorithms may be implemented to solve the clustering problem. For example, the method described by Wong et al. in "Enriched and discriminative convolutional neural network features for pedestrian re-identification and trajectory modeling" (published at Comput. Civ. Infrastruct. Eng. 36 (2021), available at: doi.org/10.1111/mice.12750), which is incorporated herein by reference in its entirety, and the improved version of the hierarchical agglomerative clustering algorithm described by Han et al. in "Data mining: concepts and techniques" (published at Elsevier, 2011, available at: doi.org/10.1016/C2009-0-61819-5), which is also incorporated herein by reference in its entirety, may be adopted. Studies of ReID models show that the identity matching process greatly relies on the quality of the features extracted, for example, how identity-discriminative each feature vector is. Hence, developing a robust ReID method is considered as a key to facilitate step 220 in the method 200 as shown in FIG. 2A, which is achieved by implementing the similarity loss in the ReID model as described in the present disclosure.

Figure 2C:
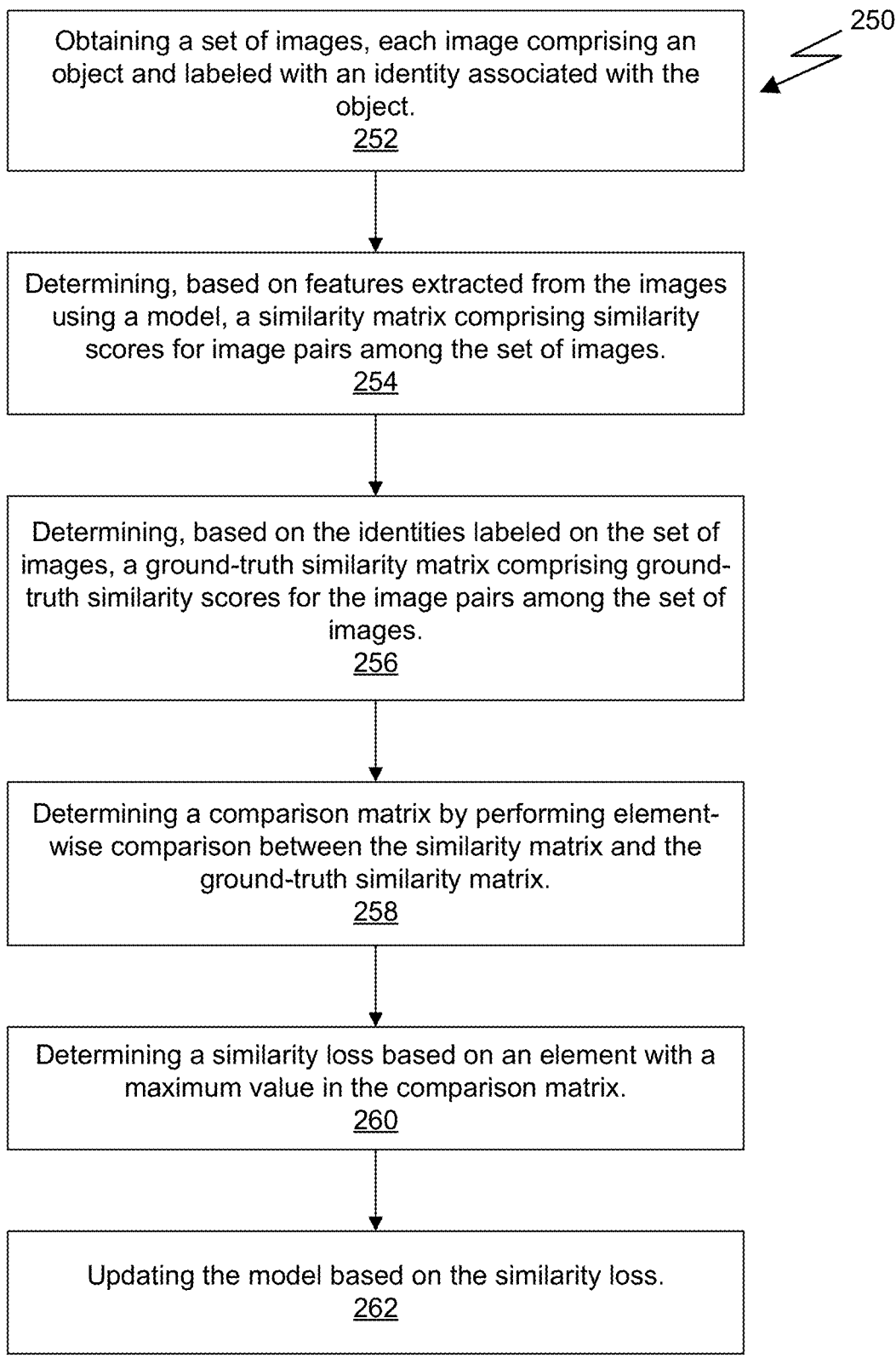
FIG. 2C is a flowchart of a method for training a model for re-identification, in accordance with some embodiments.

FIG. 2C is a flowchart of a method 250 for training a model for re-identification, by implementing the techniques described in step 220. The method 250 may be performed by a system including multiple cameras 120, one or more computing devices 130, and other suitable devices as shown in FIG. 1A/1B, which may be set up in a network environment 100 as shown in FIG. 1A. It will be recognized that the method 250 may be performed in any suitable environment and that any of the blocks in FIG. 2C may be performed in any suitable order.

At step 252, a computing device 130 obtains a set of images. Each image in the set of images includes an object and is labeled with an identity associated with the object. For example, the images with identities may be similar to the ones in the similarity matrix 500 as shown in FIG. 5.

At step 254, the computing device 130 determines a similarity matrix based on features extracted from the images using the model. The similarity matrix includes similarity scores for image pairs among the set of images.

At step 256, the computing device 130 determines a ground-truth similarity matrix based on the identities labeled on the set of images. The ground-truth similarity matrix includes ground-truth similarity scores for the image pairs among the set of images.

At step 258, the computing device 130 determines a comparison matrix by performing element-wise comparison between the similarity matrix and the ground-truth similarity matrix.

At step 260, the computing device 130 determines a similarity loss based on an element with a maximum value in the comparison matrix.

At step 262, the computing device 130 updates the model based on the similarity loss.

The trained model may be used by the computing device 130 to perform step 220 of the method 200 as shown in FIG. 2A.

At step 230, the computing device 130 classifies the one or more objects based on the features extracted from the data. Block 230 in FIG. 2B shows exemplary results by performing step 230. As shown in block 230, each image is associated with a label, such as labels 232, 234, 236, and 238, indicating a PPE status for the detected worker in the image. Studies show that necessary PPEs including helmet and vest are needed for working on site most of the time. Hence, classifying whether workers are carrying these two PPEs will enable the monitoring of routine compliance with regard to site safety. Identification of the PPE status of a worker may be formulated as a multi-class classification problem. For instance, each worker may be classified as one of the pre-defined PPE statuses.

Figure 7:
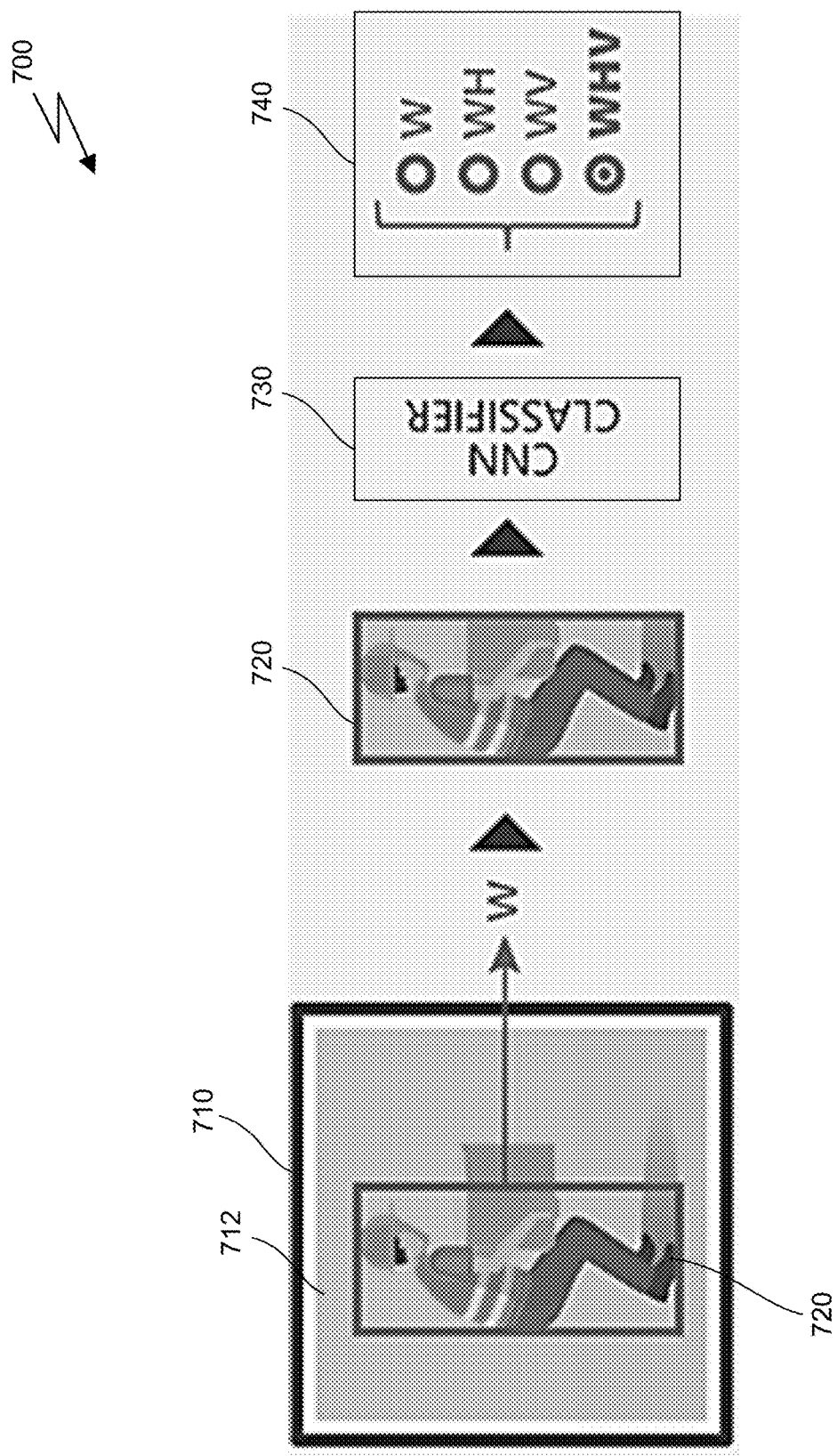
FIG. 7 illustrates a workflow for PPE classification, in accordance with some embodiments.

FIG. 7 illustrates a workflow 700 for PPE classification, which can be performed by the computing device 130. As shown in block 710, the computing device 130 may obtain data including a raw image 712 and generate a bounding box 720 for a detected worker in the raw image 712 by performing step 210 of the method 200 as shown in FIG. 2A. The image 720 corresponds to the bounding box 720. The computing device 130 may implement a CNN 730 as a classifier, which takes the image 720 as an input and outputs a PPE status as one of the pre-defined PPE statuses as shown in block 740. In this example, four PPE classes/statuses are defined. A first class "W" indicates a worker wearing neither of the two necessary PPEs. A second class "WH" indicates a worker with helmet only. A third class "WV" indicates a worker with vest only. A fourth class "WHV" indicates a worker with both helmet and vest.

Various vision-based approaches for detecting helmet and vest worn by a worker may be adopted by the computing device 130 to train a model (e.g., the CNN 730) to facilitate step 230.

Studies show that a training dataset including imbalanced samples among classes can notably degrade the accuracy of the model with regard to PPE classification. For example, in a training dataset, image samples labeled with classes "WH" and "WHV" may constitute the majority of the training dataset (i.e. more than 90%), leaving the ones labeled with classes "W" and "WV" being minority classes in the training dataset. The imbalanced samples among classes in a training dataset may bias the feature learning of a model towards the majority classes, because the model cannot exploit features from images of other classes due to insufficient samples. Consequently, the trained model, such as the CNN 730 in FIG. 7, may show much lower classification accuracies particularly for the minority classes "W" and "WV," resulting in a portion of these samples being misclassified as majority classes. For example, images labeled with "WV" may be classified as "WHV." In other words, quite a few workers without a helmet may be undesirably overlooked, thus rendering the monitoring of the safety compliance as being unreliable. Since class imbalance in the dataset is possibly the root cause, a methodology is needed for achieving robust performance on minority classes under limited training samples.

In an embodiment, the computing device 130 may adopt a weighted-class strategy in the workflow 700 as shown in FIG. 7 to facilitate the model learning of the CNN 730 towards minority classes in a training dataset. The weighted-class strategy may manipulate the weights of the classes when the samples (i.e., the image samples) in the training dataset participate in the backward propagation of the model, for example, by controlling how much each sample influences the update of the model. The general principle is to increase the weights of the samples in the minority classes, such that these samples impose a larger influence than the ones in a majority class on the loss computation. In some instances, the weight for each class may be determined by, $$\text{new class weight, } W_c = \frac{\max_c S_c}{S_c}, \quad \text{(Eq. 3)}$$

where $W_c$ is a new class weight for the class c, $S_c$ is the number of samples in the class c. According to Equation 3, the determination of the weights for the classes takes into account the ratios of the sample counts among all classes. Formally, given the number of samples among each class ($S_c$), the largest number is first found by $\max S_c$. Then, within each class c, a new class weight is determined by dividing $\max S_c$ by the sample count of class c ($S_c$). The new weight $W_c$ may then be assigned to every sample of class c during the model training. In this way, the samples may contribution to the computation of losses according to their assigned weights. The weighted-class strategy may be combined with various types of algorithms for loss computation. For example, the computing device 130 may adopt the softmax loss algorithm for loss computation, in which the samples in the training dataset may be processed according to the new class weights computed by applying Equation 3.

The weighted-class strategy aims to equalize the aggregated contribution among all classes, when a dataset includes imbalanced numbers of samples in different classes. Numerically, the new weight of the class with the largest sample count is 1.0

$$\left(\max_c S_c = S_c\right).$$

The new weights of other classes with fewer samples are increased proportionally to the ratios of the sample counts, $$\frac{\max_c S_c}{S_c}.$$

For example, a class with half the maximum number of samples may receive a new weight of 2.0, such that each sample has a doubled influence on a model relative to that in the class with the largest sample count. On the other hand, for each class c, the product $S_c \times W_c$ yields the same value of $$\max_c S_c,$$

such that the total weighted influences by the samples in each of the classes are equivalent. In this way, the problem of biased training due to imbalanced samples among different classes can be mitigated by balancing the weighted influences. Hence, the trained model incorporated with the weighted-class strategy can be more robust in performing PPE classification especially for the minority classes with limited training samples.

Figure 2D:
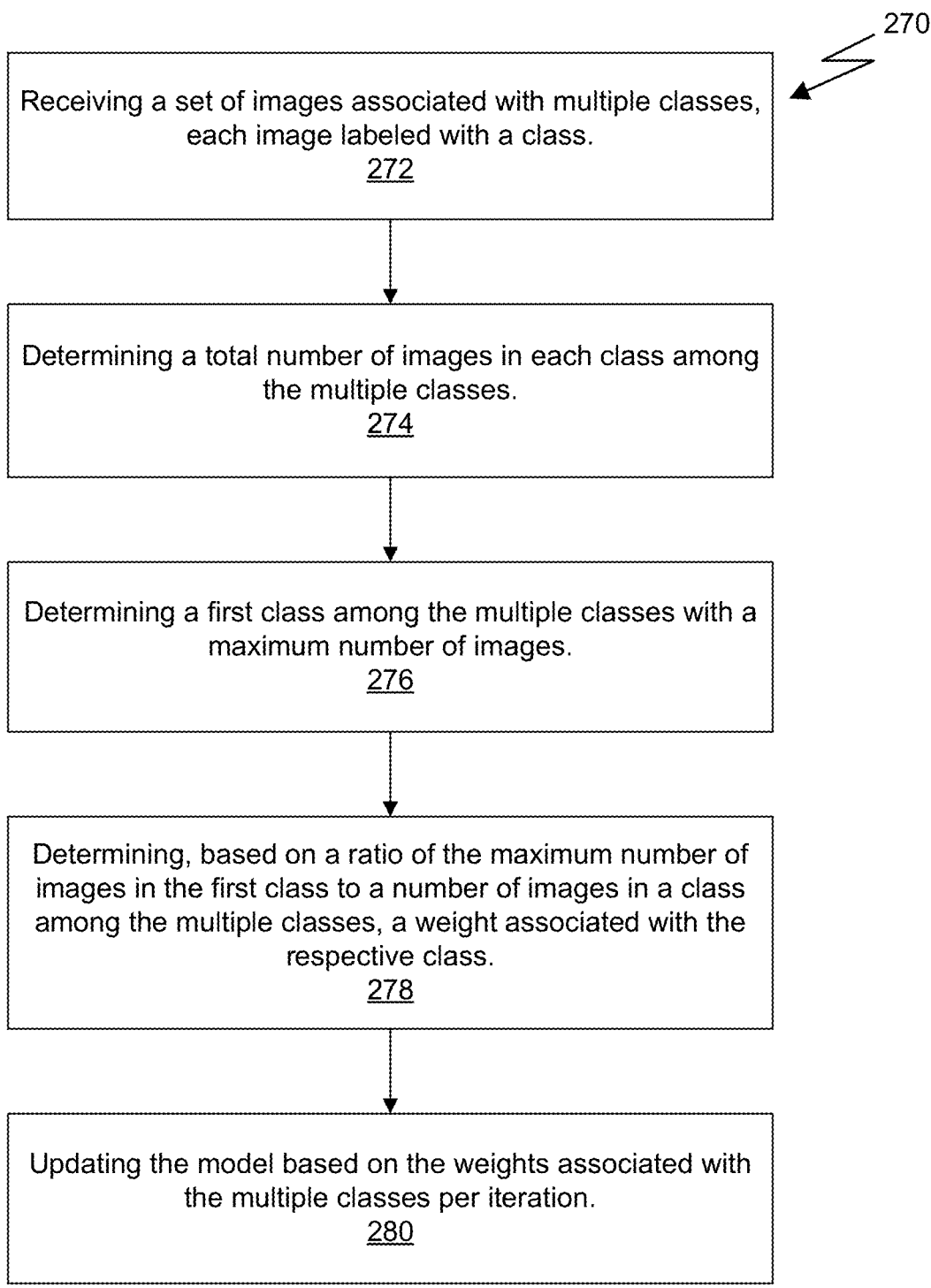
FIG. 2D is a flowchart of a method for training a model for performing classification, in accordance with some embodiments.

FIG. 2D is a flowchart of a method 270 for training a model for performing classification, by implementing the techniques described in step 230. The method 270 may be performed by a system including multiple cameras 120, one or more computing devices 130, and other suitable devices as shown in FIG. 1A/1B, which may be set up in a network environment 100 as shown in FIG. 1A. It will be recognized that the method 270 may be performed in any suitable environment and that any of the blocks in FIG. 2D may be performed in any suitable order.

At step 272, a computing device 130 receives a set of images associated with multiple classes. Each image is labeled with a class.

At step 274, the computing device 130 determines a total number of images in each class among the multiple classes.

At step 276, the computing device 130 determines a first class among the multiple classes with a maximum number of images.

At step 278, the computing device 130 determines a weight associated with the respective class based on a ratio of the maximum number of images in the first class to a number of images in a class among the multiple classes.

At step 280, the computing device 130 updates the model based on the weights associated the multiple classes per iteration.

The trained model may be used by the computing device 130 to perform step 230 of the method 200 as shown in FIG. 2A.

At step 240, the computing device 130 determines safety compliance for the one or more objects based on the identification and the classification results from steps 220 and 230. The exemplary results of performing step 240 by using the computing device 130 are demonstrated in block 240 of FIG. 2B.

Figure 8:
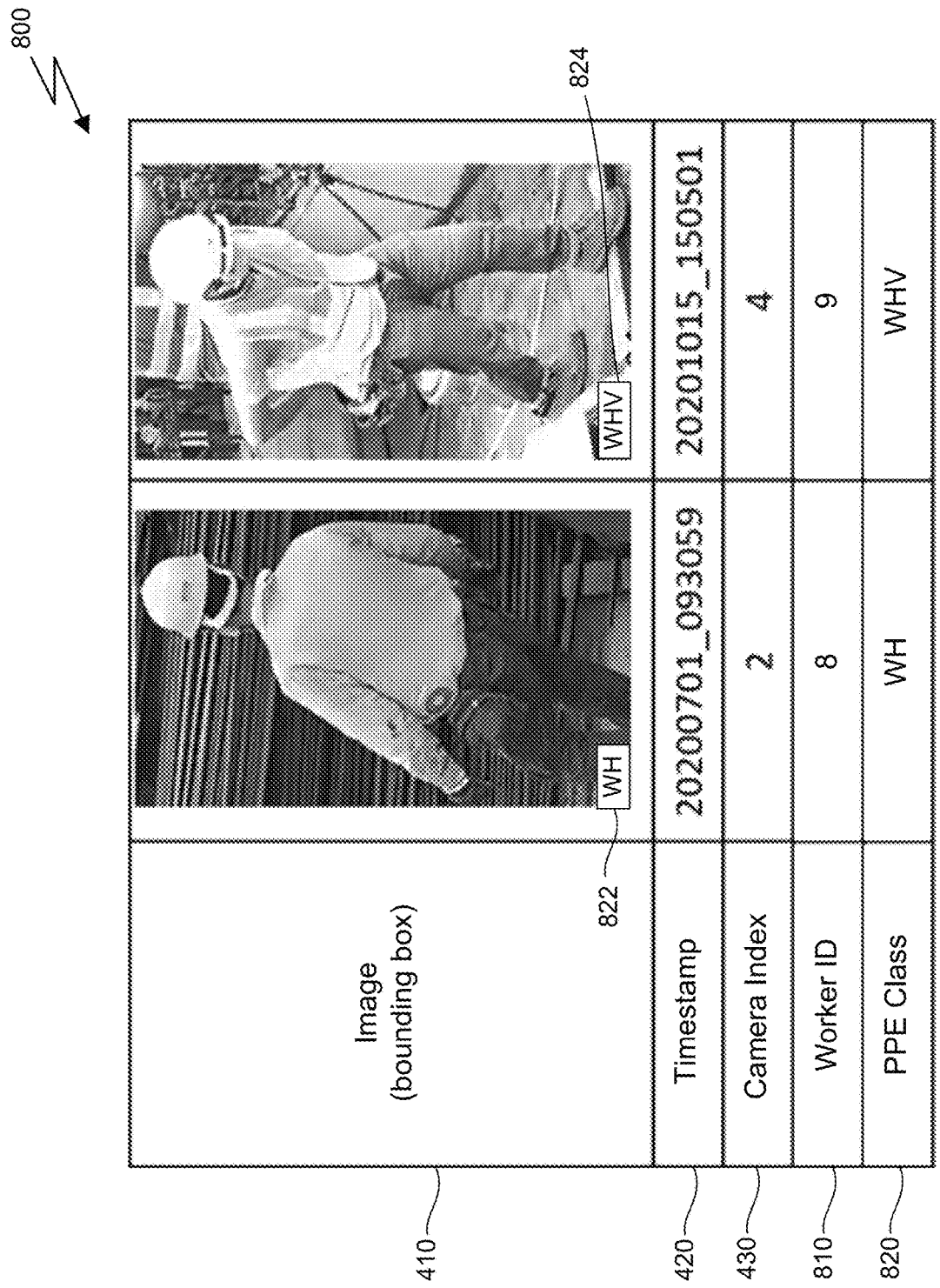
FIG. 8 is a table presenting information associated with multiple images for monitoring of site safety compliance, in accordance with some embodiments.

By performing steps 220 and 230 of the method 200, the computing device 130 may obtain additional information, such as worker IDs and PPE classes, associated with the images, which may be added as additional rows to the table 400 as shown in FIG. 4. FIG. 8 is a table 800 presenting information associated with multiple images for monitoring of site safety compliance. As shown in FIG. 8, the table 800 includes rows of images 410, timestamps 420, and camera indices 430, which are also included in the table 400. After performing steps 220 and 230, the computing device 130 may determine worker IDs 810 and PPE classes 820, and then add corresponding rows to the table 800. In some variations, the computing device 130 may add labels, such as 822 and 824, on the images indicating the PPE classes 820 corresponding to the images.

As the foregoing illustrates, an identity and PPE status may be output for each worker. To this end, the results for all the workers may be integrated for monitoring the safety compliance on a site, for example, by determining whether each worker wears the necessary PPEs properly on the site. Any incident of missing-PPE may be logged for regular reporting. In some examples, safety reports, such as the report in block 240 as shown in FIG. 2B, can be generated regularly, for site officers to review the on-site behaviors of workers and devise remedial measures for enhanced safety awareness.

Furthermore, the determined safety statuses (e.g., the safety report as shown in FIG. 2B) may be used in various ways. In one example, on-site warnings may be generated based on the monitoring of the safety status. For instance, when an incident of missing-PPE is detected, an alarm, flashing lights, or a combination thereof may be triggered in real-time to alert workers of the incompliant action. Different levels of warning may be predefined based on the severity of the incident. In another example, warning messages may be generated based on the monitoring of the safety status. Examples of the warning messages include but not limited to messages via a messenger application (APP) on mobile phones (e.g., WhatsApp messenger APP), system-generated emails with screenshots capturing any incident, etc. The warning messages may be used to inform off-site officers or safety managers of the potential risks on the site, allowing for more careful monitoring of on-site worker behavior. In still another example, historical data may be collected for statistical analysis of trends in detected incidents, for example, to generate daily or monthly summaries of each incident type in each particular area or project site. The statistical analysis may provide guidance for contractors to plan for long-term remedial actions so as to change worker behavior and mitigate site hazards.

Figure 9A:
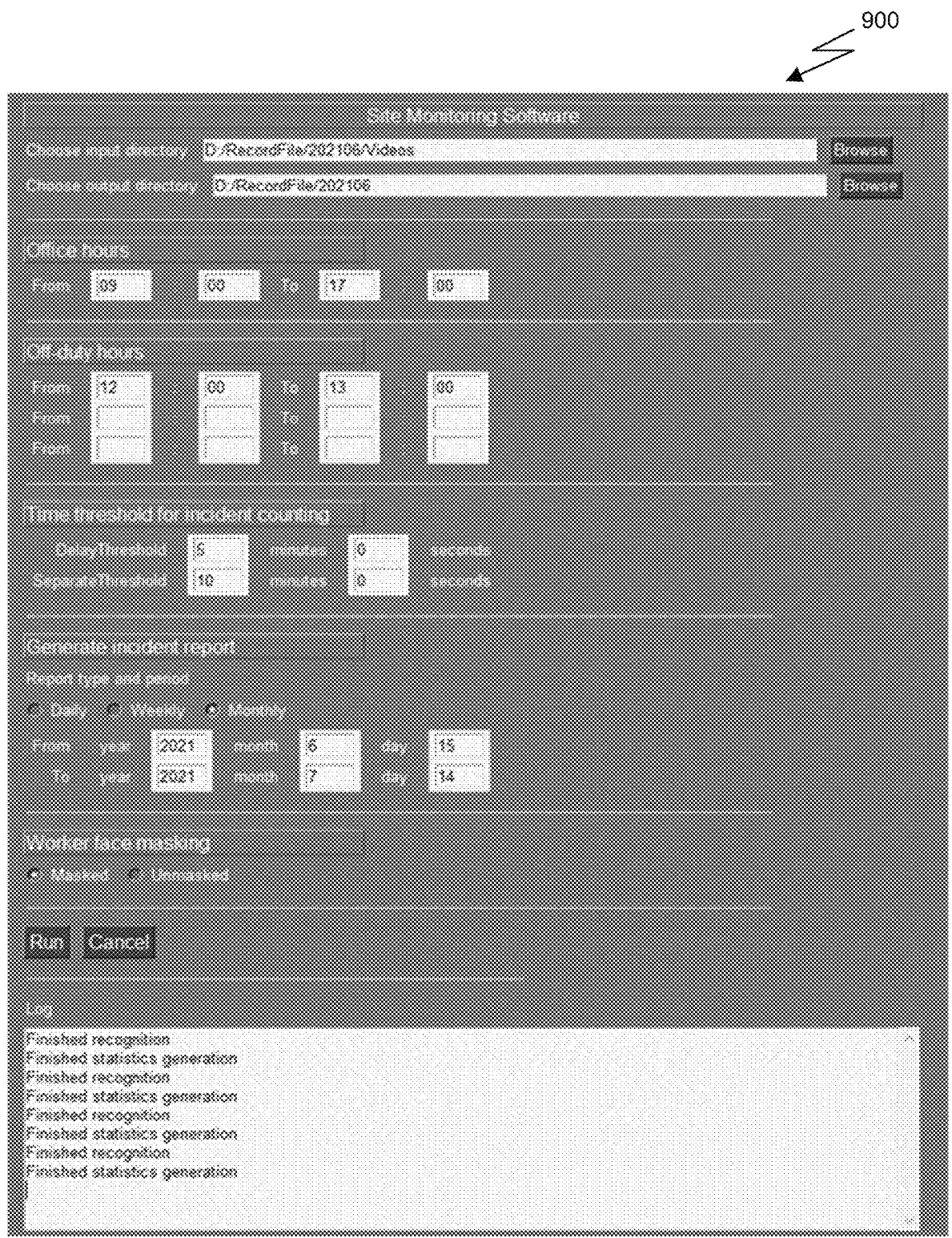
FIG. 9A is a screenshot of an exemplary user interface 900 of a site monitoring software, in accordance with some embodiments.

In some instances, the computing device 130 may run a software developed to facilitate the ReID and PPE classification functions so as to automate the process of site monitoring. By running the software, the computing device 130 may cause display of a user interface, which may present the overall workflow and functionalities for site analytics in practice. FIG. 9A is a screenshot of an exemplary user interface 900 of a site monitoring software. The software can be run on various types of computing devices preferably with accelerated computing resources such as graphical processing units (GPUs). To start with, a user may first choose a data folder for storing the raw input videos, and a folder for saving the generated output. The software may provide options for the user to define on-duty and/or off-duty hours. The on-duty hours may be used for selectively processing the videos within certain periods. For example, videos within 12:00-13:00 may be omitted if this is the lunch hour when site operations are mostly suspended. The software may also allow the user to define the time span and the type of incident report to be generated. For example, a 1-month period may be input such that the videos within this period are analyzed. Any incidents like a worker not wearing PPEs are logged, where the incident statistics may be aggregated daily, weekly or monthly. For visual inspection by safety officers, video frames capturing the incidents are extracted to a local database. To preserve the privacy of workers, their faces can be automatically blurred upon saving the video frames. By clicking the "Run" button on the user interface, video processing starts and the results are saved automatically.

A workflow may be designed for more practical incident counting, the pseudo code of which is summarized in Table 1. The computing device 130 may perform the process of incident counting based on the code as shown in Table 1.

TABLE 1

Pseudo code for incident counting

Input:
  1. All processed bounding boxes each labeled timestamp t, identity i, PPE status p
  2. Time threshold $T_b$, $T_r$
For each identity i:
    Boxes = {bounding boxes labeled i, sorted by timestamps}
    $t_b$, $t_{curr}$, count = 0
    state = negative
    For each box in Boxes:
        If $t_{curr}$ == 0:
            $t_{curr}$ = t #Initialize tracker of current t at the first frame
        If p ∈ {'W', 'WV', 'WH'}:
            If state == negative: #Check minimum buffer time
                $t_b$ = $t_b$ + (t − $t_{curr}$)
                If $t_b$ ≥ $T_b$:
                    state = positive
                    count = count + 1
                    $t_b$ = 0
            Else: #Check maximum reset time
                If t − $t_{curr}$ ≥ $T_r$:
                    state = negative
        Else: #Reset state if worn the necessary PPEs
            state = negative
            $t_b$ = 0
        $t_{curr}$ = t After the computing device 130 processes the video frames from the multiple cameras 120 by performing steps 210-230 of the method 200, the computing device 130 may obtain a set of bounding boxes, each labeled with a timestamp ("t"), worker identity ("i") and PPE status ("p"). Then, the computing device 130 may perform incident counting for each individual worker. For instance, the computing device 130 may extract the boxes associated with each worker and sort the extracted boxes in a chronological time series. For each worker, a state tracker ("state" in Table 1) and incident counter ("count" in Table 1) are initialized. By processing the labeled information (t, i, and p) of each bounding box, the state tracker and incident counter are updated upon meeting the criteria for recognizing an incident.

Figure 9B:
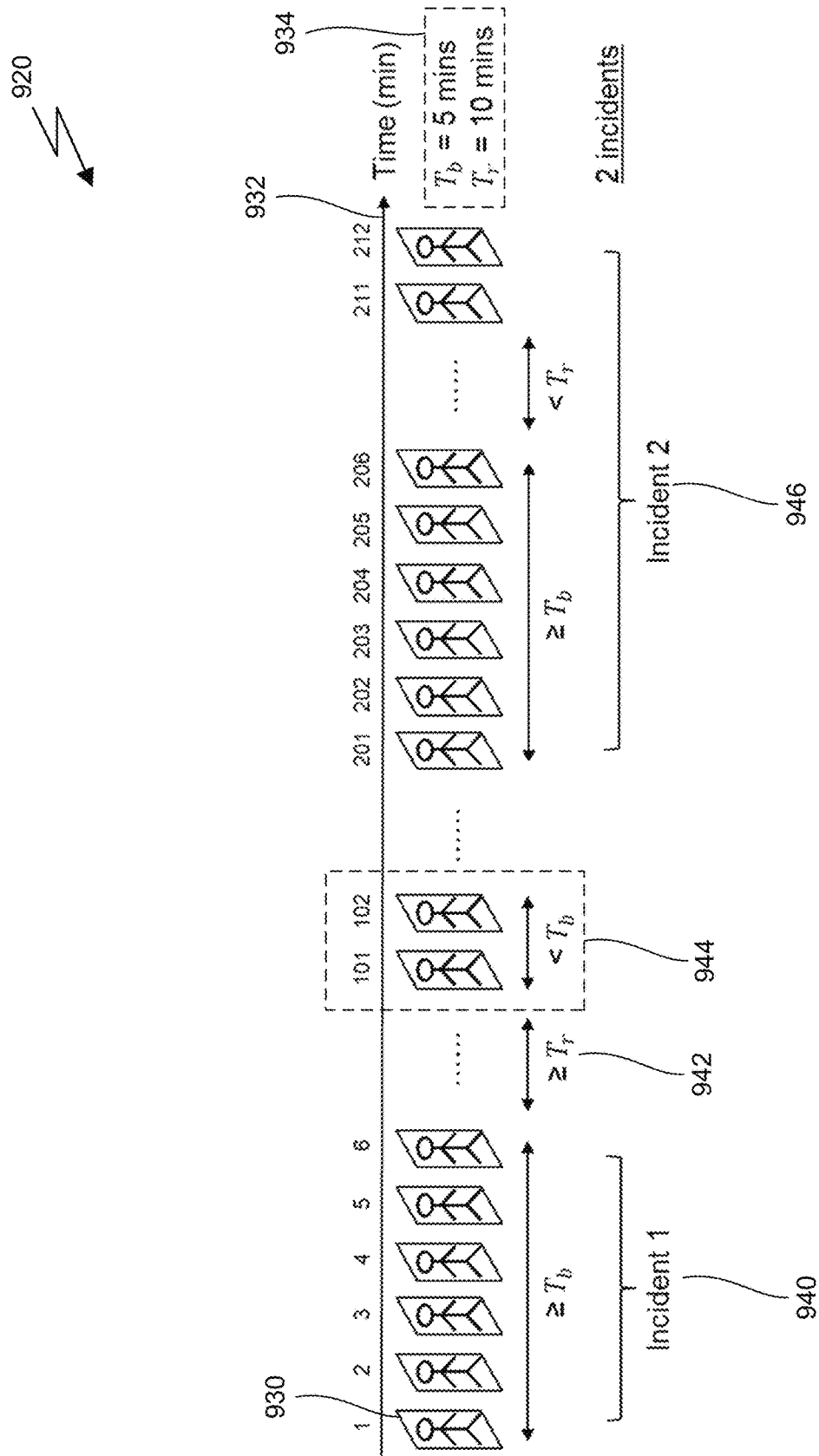
FIG. 9B demonstrates an exemplary procedure performed by the computing device for incident counting, in accordance with some embodiments.

The computing device 130 may decide how to count an incident based on two parameters, which are (1) a minimum buffer time $T_b$, and (2) a maximum reset time $T_r$. FIG. 9B demonstrates an exemplary procedure 920 performed by the computing device 130 for incident counting that is governed by the two parameters $T_b$ and $T_r$. As shown in FIG. 9B, the boxes 930 associated with a worker is sorted along a time axis 932. The parameters $T_b$ and $T_r$, as shown in block 934, are set with predefined values, for example, via the user interface 900 as shown in FIG. 9A.

The parameter $T_b$ imposes a minimum period as the buffer time before starting to count boxes in one incident. The minimum buffer time $T_b$ aims to make the incident logging more reasonable by inserting a mechanism of delayed counting, since a worker may for example take off the helmet for a while to adjust its tightness under safe surrounding conditions. Without a buffer time, penalizing a worker as not wearing the PPEs in every frame may be overly strict for compliance monitoring. As an example of determining an incident, the computing device 130 may count a number of consecutive boxes 930, each of which is associated with a "without PPE" status identified in the respective box 930, and determine a cumulative time period based on the timestamps of the counted boxes 930. When the cumulative time period is greater than or equal to $T_b$, the computing device 130 may decide an instance of an incident, to which the number of consecutive boxes 930 are associated with. As shown in FIG. 9B, the computing device 130 may determine a first incident 940 and a second incident 946. The computing device 130 may decide an instance 944 not being an incidence because the cumulative time period corresponding to the instance 944 is shorter than the minimum buffer time $T_b$. In the pseudo code as shown in Table 1, a timer $t_b$ is set to track the duration of a worker not wearing any of the necessary PPEs. When the timer $t_b$ attains the minimum buffer time (i.e., $t_b$≥$T_b$), the state of the respective worker becomes "positive" and the incident count is incremented. Otherwise (i.e., $t_b$<$T_b$), the state returns to "negative." The counting of boxes for a next incident may start once the computing device 130 identifies a next box with a "without-PPE" status.

The other parameter $T_r$ is used to determine whether to separately count two incidents with a time gap in between. A maximum time gap defines a reasonable duration beyond which an incident terminates. For instance, if the computing device 130 does not observe an "without PPE" status for a certain time period, the computing device 130 may reset the state tracker to the initial value of "negative." As shown in FIG. 9B, the computing device 130 may maintain "positive" status of the state tracker when counting the boxes associated with the incident 1 940. Then, the computing device 130 may not be able to detect the worker for a time gap. For example, the worker may leave the scene under surveillance (e.g. back to a site office with no PPE required), such that the PPE status is unknown within the time gap. By the time the worker reappears, any missing-PPE behavior should be unrelated to the previous incidents and hence counted as a new one. As such, if two boxes with "positive" status are separated by the pre-defined time gap (i.e., t $t_{curr}$ $T_r$), the counter of the current incident is reset, and any boxes with "positive" status in future timestamps will possibly be counted as another incident upon meeting the minimum buffer criteria. Otherwise (i.e., t−$t_{curr}$<$T_r$), the computing device 130 may continue to the count the boxes with "positive" status as being included in the current incident. For example, the Incident 2 946 as shown in FIG. 9B includes a time gap that is smaller than the maximum reset time $T_r$.

Figure 2E:
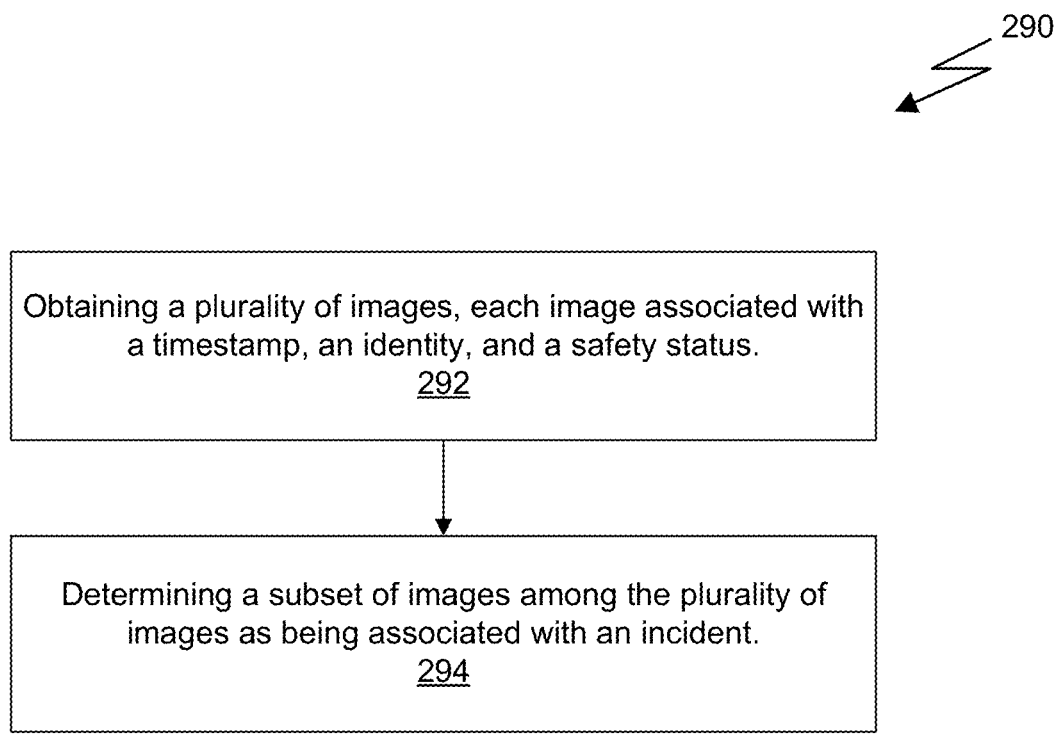
FIG. 2E is a flowchart of a method for monitoring site safety compliance, in accordance with some embodiments.

FIG. 2E is a flowchart of a method 290 performed by the computing device 130 for monitoring site safety compliance, by implementing the techniques described in step 240. It will be recognized that the method 290 may be performed in any suitable environment and that any of the blocks in FIG. 2E may be performed in any suitable order.

At step 292, the computing device 130 obtains a plurality of images. Each image is associated with a timestamp, an identity, and a safety status, for example, as shown in the table 800 in FIG. 8.

At step 294, the computing device 130 determines a subset of images among the plurality of images as being associated with an incident. The subset of images are associated with a time period greater than or equal to a minimum buffer time threshold. Furthermore, the subset of images may include one or more time gaps, each of which is shorter than a time gap threshold.

Additional details and advantages relating to exemplary embodiments of the present disclosure are discussed in Cheng, J. P., Wong, P. K. Y., Luo, H., Wang, M., & Leung, P. H., "Vision-based monitoring of site safety compliance based on worker re-identification and personal protective equipment classification," Automation in Construction, 139, 104312 (available at doi.org/10.1016/j.autcon.2022.104312), which is incorporated by reference in its entirety herein.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. The elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for monitoring safety compliance, comprising:
    a plurality of cameras configured to obtain data, the data comprising multiple images associated with one or more objects; and
    a computing system configured to process the data to determine the safety compliance of the one or more objects associated with the multiple images based on implementing a first model trained for re-identification;
    wherein the computing system is further configured to train the first model for re-identification, wherein training of the first model for re-identification comprises:
        obtaining a first set of images, each image in the first set of images comprising an object and labeled with an identity associated with the object;
        determining, based on features extracted from the images using the first model, a similarity matrix comprising similarity scores for image pairs among the first set of images;
        determining, based on the identities labeled on the set of images, a ground-truth similarity matrix comprising ground-truth similarity scores for the image pairs among the first set of images;
        determining a comparison matrix by performing element-wise comparison between the similarity matrix and the ground-truth similarity matrix;
        determining a similarity loss based on an element with a maximum value in the comparison matrix; and
        updating the first model based on the similarity loss;
    wherein the ground-truth similarity scores for the image pairs among the first set of images are determined based on a smoothing parameter P, wherein P is adjustable between zero and one; and
    wherein each pair of images with the same identity is assigned with P as the respective ground-truth similarity score, and wherein each pair of images with different identities is assigned with 1−P as the respective ground-truth similarity score.

2. The system according to claim 1, wherein each pair of images among the first set of images comprises a first image and a second image, and
    wherein determining the similarity matrix comprising similarity scores for image pairs among the first set of images further comprises:
        determining, for each pair of images, a first feature vector for the respective first image and a second feature vector for the respective second image; and
        determining, based on the first feature vector and the second feature vector, a cosine similarity as the similarity score for the respective pair of images, wherein the cosine similarity is obtained by dividing the product of the first feature vector and the second feature vector by the absolute values of the first feature vector and the second feature vector.

3. The system according to claim 1, wherein determining the comparison matrix by performing element-wise comparison between the similarity matrix and the ground-truth similarity matrix further comprises:
    determining an absolute difference or a squared difference between each similarity score in the similarity matrix and a corresponding ground-truth similarity score in the ground-truth similarity matrix, wherein the respective similarity score and the corresponding ground-truth similarity score are associated with the same respective pair of images.

4. The system according to claim 1, wherein the computing system is further configured to train a second model for classification, wherein training the second model for classification comprises:
receiving a second set of images associated with multiple classes, wherein each image in the second set of images is labeled with a class;
determining a total number of images in each class among the multiple classes;
determining a first class among the multiple classes with a maximum number of images;
determining, based on a ratio of the maximum number of images in the first class to a number of images in a class among the multiple classes, a weight associated with the respective class; and
updating the second model based on the weights associated with the multiple classes per iteration.

5. The system according to claim 4, wherein the weight associated with a respective class is assigned to all the images in the respective class during the training of the second model; and
wherein computation of loss per iteration is based on the weights associated with the images in the second set of images.

6. The system according to claim 4, wherein processing the data to determine the safety compliance of the one or more objects associated with the multiple images further comprises:
identifying, by using the first model, the one or more objects based on features extracted from the multiple images in the data;
classifying, by using the second model, the one or more objects based on the features extracted from the multiple images in the data; and
determining the safety compliance for the one or more objects based on the identification and classification results.

7. The system according to claim 6, wherein the identification and classification results comprise the multiple images, and each image among the multiple images is associated with a timestamp, an identity, and a safety status; and
wherein the computing system is further configured to:
determine a subset of images among the multiple images as being associated with an incident, wherein the subset of images are in a class indicating a non-compliant safety status, wherein the subset of images are associated with a time period greater than or equal to a minimum buffer time threshold, and wherein the subset of images include one or more time gaps, wherein each time gap is shorter than a time gap threshold.

8. The system according to claim 7, wherein the computing system is further configured to:
generate a log comprising detected incidents; and
generate warnings corresponding to the detected incidents, wherein the warnings comprise any of a warning message, an alarm, a flashing light.

9. A method for monitoring safety compliance, comprising:
obtaining, by a computing system, data from a plurality of cameras, the data comprising multiple images associated with one or more objects; and
processing, by the computing system, the data to determine the safety compliance of the one or more objects associated with the multiple images based on implementing a first model trained for re-identification;
wherein the first model is trained for re-identification based on:
obtaining a first set of images, each image in the first set of images comprising an object and labeled with an identity associated with the object;
determining, based on features extracted from the images using the first model, a similarity matrix comprising similarity scores for image pairs among the first set of images;
determining, based on the identities labeled on the set of images, a ground-truth similarity matrix comprising ground-truth similarity scores for the image pairs among the first set of images;
determining a comparison matrix by performing element-wise comparison between the similarity matrix and the ground-truth similarity matrix;
determining a similarity loss based on an element with a maximum value in the comparison matrix; and
updating the first model based on the similarity loss;
wherein the ground-truth similarity scores for the image pairs among the first set of images are determined based on a smoothing parameter P, wherein P is adjustable between zero and one; and
wherein each pair of images with the same identity is assigned with P as the respective ground-truth similarity score, and wherein each pair of images with different identities is assigned with 1–P as the respective ground-truth similarity score.

10. The method according to claim 9, further comprising training of a second model for classification, wherein training the second model for classification comprises:
receiving a second set of images associated with multiple classes, wherein each image in the second set of images is labeled with a class;
determining a total number of images in each class among the multiple classes;
determining a first class among the multiple classes with a maximum number of images;
determining, based on a ratio of the maximum number of images in the first class to a number of images in a class among the multiple classes, a weight associated with the respective class; and
updating the second model based on the weights associated the multiple classes per iteration.

11. The method according to claim 10, wherein the weight associated with a respective class is assigned to all the images in the respective class during the training of the second model; and
wherein computation of loss per iteration is based on the weights associated with the images in the second set of images.

12. The method according to claim 10, wherein processing the data to determine the safety compliance of the one or more objects associated with the multiple images further comprises:
identifying, by using the first model, the one or more objects based on features extracted from the multiple images in the data;

classifying, by using the second model, the one or more objects based on the features extracted from the multiple images in the data; and
determining the safety compliance for the one or more objects based on the identification and classification results.

13. The method according to claim 12, wherein the identification and classification results comprise the multiple images, and each image among the multiple images is associated with a timestamp, an identity, and a safety status; and
wherein the method further comprises: determining a subset of images among the multiple images as being associated with an incident, wherein the subset of images are in a class indicating a non-compliant safety status, wherein the subset of images are associated with a time period greater than or equal to a minimum buffer time threshold, and wherein the subset of images include one or more time gaps, wherein each time gap is shorter than a time gap threshold.

14. A non-transitory computer-readable medium having processor-executable instructions stored thereon for monitoring safety compliance, wherein the processor-executable instructions, when executed, cause performance of the following:
obtaining data from a plurality of cameras, the data comprising multiple images associated with one or more objects; and
processing the data to determine the safety compliance of the one or more objects associated with the multiple images based on implementing a first model trained for re-identification;
wherein the first model is trained for re-identification based on:
obtaining a first set of images, each image in the first set of images comprising an object and labeled with an identity associated with the object;
determining, based on features extracted from the images using the first model, a similarity matrix comprising similarity scores for image pairs among the first set of images;
determining, based on the identities labeled on the set of images, a ground-truth similarity matrix comprising ground-truth similarity scores for the image pairs among the first set of images;
determining a comparison matrix by performing element-wise comparison between the similarity matrix and the ground-truth similarity matrix;
determining a similarity loss based on an element with a maximum value in the comparison matrix; and
updating the first model based on the similarity loss;
wherein the ground-truth similarity scores for the image pairs among the first set of images are determined based on a smoothing parameter P, wherein P is adjustable between zero and one; and
wherein each pair of images with the same identity is assigned with P as the respective ground-truth similarity score, and wherein each pair of images with different identities is assigned with 1−P as the respective ground-truth similarity score.

15. The non-transitory computer-readable medium of claim 14, wherein the processor-executable instructions, when executed, further cause performance of the following:
training of a second model for classification, wherein training the second model for classification comprises:
receiving a second set of images associated with multiple classes, wherein each image in the second set of images is labeled with a class;
determining a total number of images in each class among the multiple classes;
determining a first class among the multiple classes with a maximum number of images;
determining, based on a ratio of the maximum number of images in the first class to a number of images in a class among the multiple classes, a weight associated with the respective class; and
updating the second model based on the weights associated the multiple classes per iteration.

16. The non-transitory computer-readable medium of claim 15, wherein the weight associated with a respective class is assigned to all the images in the respective class during the training; and
wherein computation of loss per iteration is based on the weights associated with the images in the second set of images.

17. The non-transitory computer-readable medium of claim 15, wherein processing the data to determine the safety compliance of the one or more objects associated with the multiple images further comprises:
identifying, by using the first model, the one or more objects based on features extracted from the multiple images in the data;
classifying, by using the second model, the one or more objects based on the features extracted from the multiple images in the data; and
determining the safety compliance for the one or more objects based on the identification and classification results.

18. The non-transitory computer-readable medium of claim 17, wherein the identification and classification results comprise the multiple images, and each image among the multiple images is associated with a timestamp, an identity, and a safety status; and
wherein the processor-executable instructions, when executed, further-facilitate cause performance of the following: determining a subset of images among the multiple images as being associated with an incident, wherein the subset of images are in a class indicating a non-compliant safety status, wherein the subset of images are associated with a time period greater than or equal to a minimum buffer time threshold, and wherein the subset of images include one or more time gaps, wherein each time gap is shorter than a time gap threshold.

19. The method according to claim 9, wherein each pair of images among the first set of images comprises a first image and a second image, and
wherein determining the similarity matrix comprising similarity scores for image pairs among the first set of images further comprises:
determining, for each pair of images, a first feature vector for the respective first image and a second feature vector for the respective second image; and
determining, based on the first feature vector and the second feature vector, a cosine similarity as the similarity score for the respective pair of images, wherein the cosine similarity is obtained by dividing the product of the first feature vector and the second feature vector by the absolute values of the first feature vector and the second feature vector.

20. The method according to claim 9, wherein determining the comparison matrix by performing element-wise comparison between the similarity matrix and the ground-truth similarity matrix further comprises:
 determining an absolute difference or a squared difference between each similarity score in the similarity matrix and a corresponding ground-truth similarity score in the ground-truth similarity matrix, wherein the respective similarity score and the corresponding ground-truth similarity score are associated with the same respective pair of images.

* * * * *